US010010106B2

(12) United States Patent
Bourg, Jr. et al.

(10) Patent No.: US 10,010,106 B2
(45) Date of Patent: Jul. 3, 2018

(54) METHOD AND APPARATUS FOR REMOVING A PORTION OF A FOOD PRODUCT WITH AN ABRASIVE STREAM

(71) Applicant: Frito-Lay North America, Inc., Plano, TX (US)

(72) Inventors: Wilfred Marcellien Bourg, Jr., Melissa, TX (US); Stephen Graham, Plano, TX (US); Richard James Ruegg, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 168 days.

(21) Appl. No.: 14/919,845

(22) Filed: Oct. 22, 2015

(65) Prior Publication Data
US 2016/0316812 A1 Nov. 3, 2016

Related U.S. Application Data

(60) Provisional application No. 62/244,240, filed on Oct. 21, 2015, provisional application No. 62/155,467, filed on Apr. 30, 2015.

(51) Int. Cl.
*A23N 7/01* (2006.01)
*A23N 7/02* (2006.01)
(Continued)

(52) U.S. Cl.
CPC ............ *A23N 7/023* (2013.01); *A23L 5/57* (2016.08); *A23L 7/00* (2016.08); *A23N 7/00* (2013.01);
(Continued)

(58) Field of Classification Search
CPC ... A23N 7/00; A23N 7/02; A23N 7/04; A23N 7/10; A23N 7/023; A23L 5/57;
(Continued)

(56) References Cited

U.S. PATENT DOCUMENTS 2,407,819 A * 9/1946 Dolan ............... A47J 17/20
451/383
2,490,431 A * 12/1949 Greene ............... A23L 19/15
426/444

(Continued)

FOREIGN PATENT DOCUMENTS

DE     3107747    *  9/1982
DE    10016140    * 10/2001

OTHER PUBLICATIONS

English Translation for DE3107747 published Sep. 1982.*
English Tranlsation for DE10016140 published Oct. 2001.*

*Primary Examiner* — Anthony Weier
(74) *Attorney, Agent, or Firm* — Brandon V. Zuniga; Colin P. Cahoon; Carstens & Cahoon, LLP

(57) ABSTRACT

A method and apparatus for causing attrition to an outer surface of a food product to provide a removed portion of the food product and a remainder of the food product. In a first aspect, an abrasive stream contacts the outer surface of the food product, thereby separating at least a portion of the outer surface of the food product from the remainder of the food product to provide the removed portion of the food product. In a second aspect, the apparatus includes a product positioner to position the food product in an attrition zone and a nozzle for discharging the abrasive stream into contact with the food product in the attrition zone. The abrasive stream can be food grade and can include a food grade fluid and a food grade abrasive, for example, air and salt, respectively.

46 Claims, 14 Drawing Sheets

(51) Int. Cl.
| | | |
|---|---|---|
| *A23N 7/00* | (2006.01) | |
| *A23L 7/00* | (2016.01) | |
| *A23N 7/04* | (2006.01) | |
| *A23N 7/10* | (2006.01) | |
| *B24C 3/00* | (2006.01) | |
| *B24C 3/08* | (2006.01) | |
| *B24C 3/10* | (2006.01) | |
| *B24C 3/12* | (2006.01) | |
| *B24C 3/18* | (2006.01) | |
| *B24C 3/32* | (2006.01) | |
| *B24C 5/00* | (2006.01) | |
| *B24C 7/00* | (2006.01) | |
| *B24C 11/00* | (2006.01) | |
| *A23L 5/00* | (2016.01) | |

(52) U.S. Cl.
CPC ............. *A23N 7/02* (2013.01); *A23N 7/04* (2013.01); *A23N 7/10* (2013.01); *B24C 3/00* (2013.01); *B24C 3/08* (2013.01); *B24C 3/10* (2013.01); *B24C 3/12* (2013.01); *B24C 3/18* (2013.01); *B24C 3/32* (2013.01); *B24C 5/00* (2013.01); *B24C 7/00* (2013.01); *B24C 7/0007* (2013.01); *B24C 11/00* (2013.01)

(58) Field of Classification Search
CPC .... A23L 7/00; B24C 3/00; B24C 3/08; B24C 3/10; B24C 3/12; B24C 3/18; B24C 3/32; B24C 5/00; B24C 7/00; B24C 7/0007; B24C 11/00
See application file for complete search history.

(56) References Cited

U.S. PATENT DOCUMENTS

| | | | | |
|---|---|---|---|---|
| 3,504,804 | A | * | 4/1970 | Arnold .................... B04C 5/103 209/17 |
| 4,384,963 | A | * | 5/1983 | Soepenberg ............ C08B 30/10 127/32 |
| 4,394,398 | A | | 7/1983 | Wilson |
| 4,420,494 | A | | 12/1983 | Glantz |
| 5,162,016 | A | | 11/1992 | Malloy |
| 5,203,794 | A | | 4/1993 | Stratford |
| 5,545,074 | A | | 8/1996 | Jacobs |
| 5,551,909 | A | | 9/1996 | Bailey |
| 7,040,959 | B1 | | 5/2006 | Panuska |
| 7,261,619 | B2 | | 8/2007 | Gadd |
| 2004/0011378 | A1 | | 1/2004 | Jackson |
| 2006/0257581 | A1 | * | 11/2006 | Wulteputte ........... B05B 12/122 427/427.2 |
| 2007/0111642 | A1 | | 5/2007 | Davis |
| 2013/0012108 | A1 | | 1/2013 | Li et al. |

\* cited by examiner

US 10,010,106 B2

METHOD AND APPARATUS FOR REMOVING A PORTION OF A FOOD PRODUCT WITH AN ABRASIVE STREAM

CROSS-REFERENCE TO RELATED APPLICATIONS

This non-provisional application claims priority to, relies on, and has been filed within the twelve months of the filing date of U.S. Provisional Patent Application Ser. No. 62/155,467, filed Apr. 30, 2015, entitled "METHOD AND APPARATUS FOR REMOVING A PORTION OF A FOOD PRODUCT WITH AN ABRASIVE STREAM," and U.S. Provisional Patent Application Ser. No. 62/244,240, filed Oct. 21, 2015, entitled "METHOD AND APPARATUS FOR REMOVING A PORTION OF A FOOD PRODUCT WITH AN ABRASIVE STREAM," each of which is hereby incorporated by reference in its entirety as an example.

BACKGROUND

Technical Field

The present invention relates to using a fluid and abrasives that are entrained within the fluid to cause attrition of the surface of a food product.

Background

Existing high volume potato peelers lack the ability to precisely control the degree of peeling accomplished. For example, existing continuous peelers use a random motion of potatoes over a bed of knives, abrasive rolls, or abrasive brushes to remove peeling from potatoes. As a result, existing peelers tend to result in under-peeling or conversely in over-peeling.

SUMMARY OF THE INVENTION

In a first aspect, the invention provides a method for causing attrition to an outer surface of a food product to provide a removed portion of the food product and a remainder of the food product. The method comprises discharging an abrasive stream into contact with the outer surface of the food product, thereby providing a discharge of the abrasive stream, and thereby separating at least a portion of the outer surface of the food product from the remainder of the food product to provide the removed portion of the food product. The abrasive stream comprises a fluid and an abrasive.

In a second aspect, the invention provides an apparatus for causing attrition to an outer surface of a food product to provide a removed portion of the food product and a remainder of the food product. The apparatus comprises a product positioner to position the food product in an attrition zone and a nozzle for discharging an abrasive stream into contact with the food product in the attrition zone, wherein the abrasive stream comprises a fluid and an abrasive entrained in the fluid.

In a third aspect, the invention provides a method for causing attrition to an outer surface of a food product to provide a removed portion of the food product and a remainder of the food product. The method comprises bringing an abrasive stream into contact with the outer surface of the food product, thereby separating at least a portion of the outer surface of the food product from the remainder of the food product to provide the removed portion of the food product. The abrasive stream comprises a fluid and an abrasive.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE DRAWINGS

Figure 1:
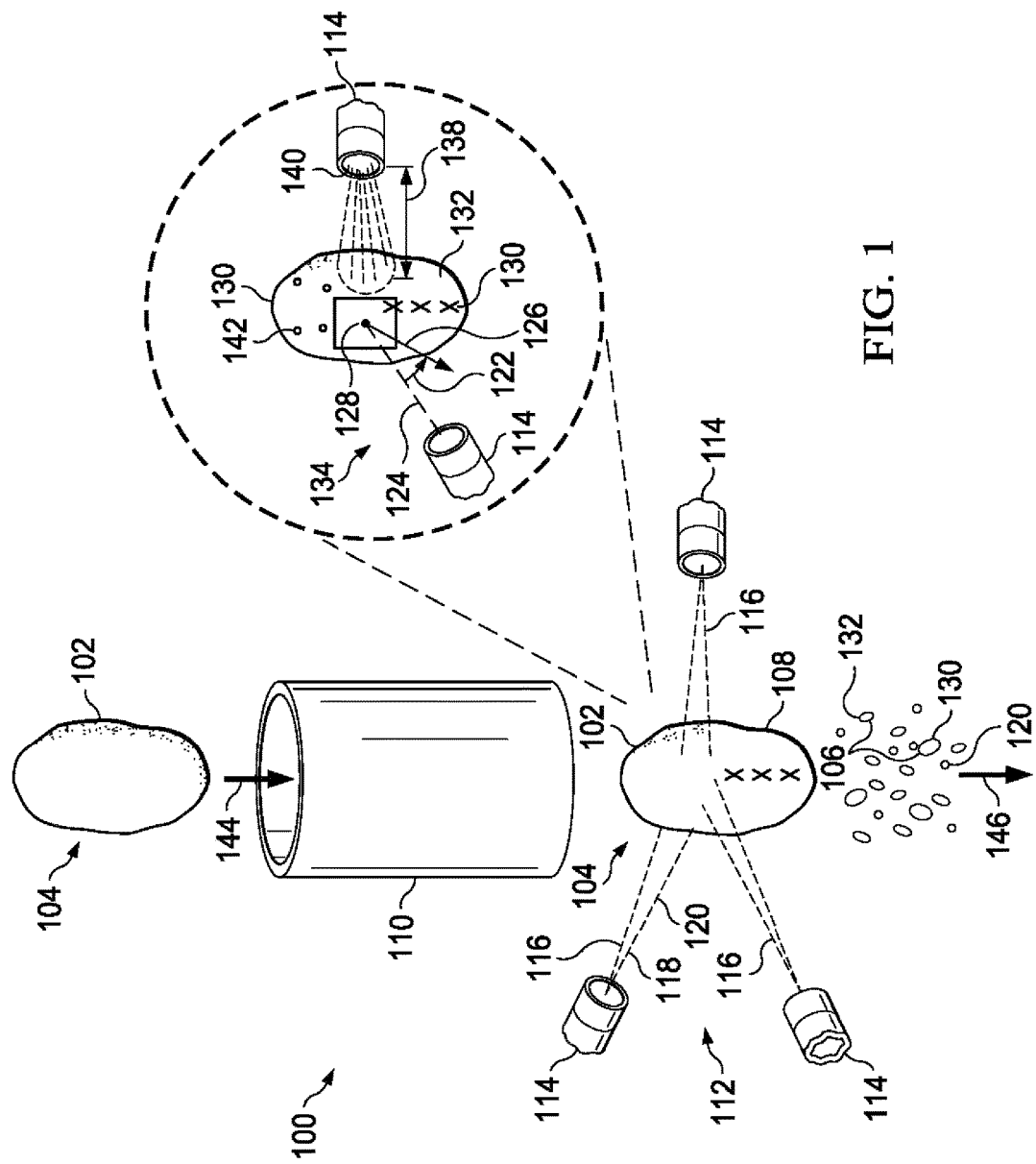
FIG. 1 is a schematic illustration of one embodiment of the invention depicting an apparatus for causing attrition to an outer surface of a food product.

In certain situations, it can be desirable to more precisely control the degree of peeling provided to a food product (e.g. a potato). For example, the characteristics of a potato peel can change when processing different varieties of potatoes, or even when processing a single potato variety depending on whether a potato is part of the first harvest of the season or late storage product.

Because a peel on one group of potatoes can be thicker or thinner or require more or less effort to remove than the peel on another group of potatoes, using the same peeler on both groups of potatoes can result in insufficient peeling for one group, but result in over-peeling and the loss of the valuable starch behind the peel for the other group. For example, the presence of unremoved peel can result in undesirable flavors or appearance. Meanwhile removing starch behind the peel can cause a costly and noticeable increase in production costs when processing large numbers of potatoes.

Additionally, existing peelers do not effectively remove peel from a concavity on a food product (e.g., eyes on potatoes). For example, in order to completely remove the peel from a concavity, typical peelers using rotating blades or knives will have to remove the entire outer surface of the food product to the depth of the peel at the bottom of the concavity.

Furthermore, because existing peelers typically peel whatever portion of a potato contacts an abrasive bed while the potato undergoes a random tumbling motion, existing peelers fail to effectively remove isolated deformities or other undesirable features (e.g. bruises) from potatoes without also removing significant amounts of potato starch.

In light of these and other shortcomings in existing devices, the inventors have developed a new method and apparatus for causing attrition to an outer surface of a food product. For example, one embodiment of the invention advantageously uses an abrasive stream to peel a food product.

Furthermore, one embodiment of the invention uses an abrasive that is safe, inexpensive, and/or readily available to peel the food product. For example, in one embodiment, the abrasive comprises, consists essentially of, or consists of substances that are non-toxic (e.g., gravel, glass, sand, rocks, dirt, minerals, salt, plant matter, and/or starch).

As another example, the abrasive of one embodiment comprises, consists essentially of, or consists of substances that typically accompany a food product from its origin (e.g., sand, rocks, minerals, salt, plant matter, and/or starch). Using such substances can provide one or more additional advantages. For example, in some embodiments, less expensive systems, less complicated systems, and/or existing systems can be used to separate the abrasive from the food product after the abrasive is used to peel the food product.

As an additional example, the abrasive can comprise, consist essentially of, or consist of substances that are food grade (e.g., minerals, salt, plant matter, and/or starch). Advantageously, in one embodiment, when using edible and/or food grade materials as the abrasive, it is not necessary to remove all or most of the abrasive from the food product before it is consumed. In contrast, if inedible and/or non-food grade abrasive becomes imbedded in the food product, additional, expensive, or complicated separation steps can be required.

As another example, in one embodiment, the abrasive can comprise, consist essentially of, or consist of an ingredient (e.g., a salt or other seasoning) in a recipe comprising the food product. As an additional benefit of one embodiment, if salt is used as the abrasive, any excess abrasive can be removed from the surface of the food product by dissolving the salt in a food grade solvent, and the salt can later be recrystallized for reuse as abrasive. Furthermore, as an advantage of using salt or potato starch as the abrasive, both materials are relatively plentiful, inexpensive, and, in some embodiments, have potential to be used as an abrasive several times.

As another benefit, one embodiment of the invention provides more precise control over the degree of peeling. As an illustration, one embodiment enables an operator to change a depth of peeling achieved by a peeler in real time by changing the velocity of the abrasive fluid used to peel a food product.

Additionally, in one embodiment, the outer surface of a food product can be removed without removing unacceptable amounts of starch.

Also, one embodiment provides the same or more complete peeling than existing peelers, but with less starch loss.

As another advantage, one embodiment of the invention can remove peel from a concavity (e.g., potato eye) on a food product (e.g., with an abrasive stream) without requiring the entire outer surface of the food product to be removed to the depth of the concavity.

Furthermore, one embodiment of the invention can selectively remove a targeted portion of a food product (e.g., bruise). For example, one embodiment comprises a sensor to determine the position of the targeted portion of the food product and a mobile, robotic nozzle to discharge an abrasive stream into contact with the targeted portion to selectively remove it.

An embodiment of the invention will now be described with reference to FIG. 1. FIG. 1 illustrates an apparatus 100 for causing attrition to an outer surface 102 of a food product 104 to provide a removed portion 106 of the food product 104 and a remainder 108 of the food product 104. As illustrated in FIG. 1, the attrition is accomplished with an abrasive stream 116 comprising a fluid 118 and an abrasive 120 entrained in the fluid 118. For example, the abrasive stream 116 can comprise an abrasive, e.g., salt or potato starch entrained in air.

As illustrated in FIG. 1, one embodiment of the invention comprises a product positioner 110 to position the food product 104 in an attrition zone 112. Examples of product positioners 110 include a stand, a drop tube, a guide, a chute, rails, a conveyor, an auger, augers, and tumblers. The embodiment of FIG. 1 also comprises an attrition nozzle 114 for discharging an abrasive stream 116 into contact with the food product 104 in the attrition zone 112.

An example of an attrition zone 112 is a space where an abrasive stream 116 discharged from an attrition nozzle 114 can cause attrition to the outer surface 102 of the food product 104. For example, for a stationary attrition nozzle 114, the attrition zone 112 is a volume of space within the path of the abrasive stream 116. As another example, for a robotic attrition nozzle 114 (e.g., a mobile attrition nozzle 114 with an actuator for changing the position and/or orientation of the attrition nozzle 114), the attrition zone 112 is a volume of space encompassing all the possible paths of the abrasive stream 116 given the range of motion of the robotic attrition nozzle 114 and the possible velocities of the abrasive stream 116.

Figure 3:
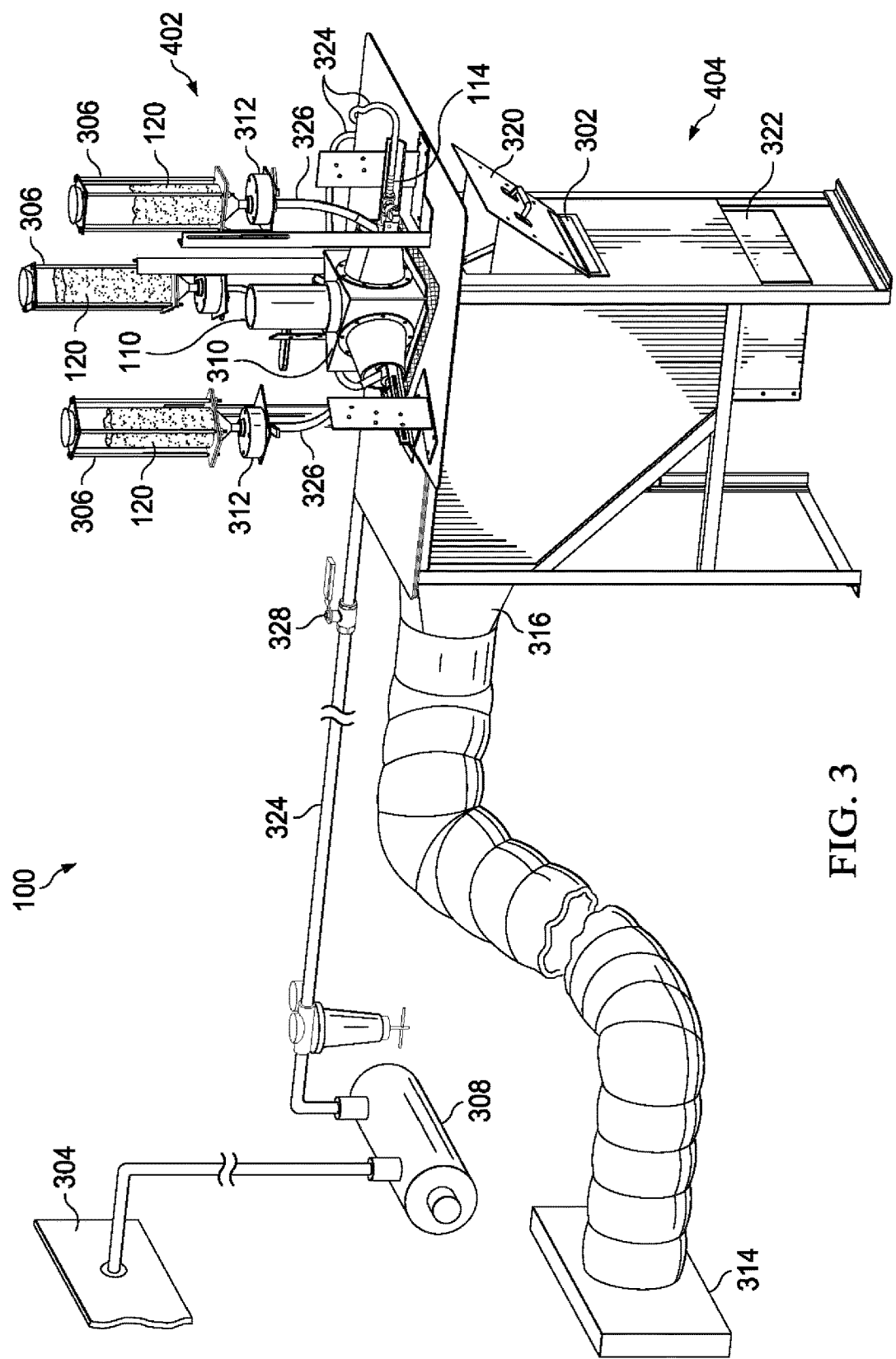
FIG. 3 is a schematic illustration of one embodiment of the invention depicting a nozzle assembly, a container assembly, a fluid source, a pressurizer for the fluid and a vacuum source.
Figure 4:
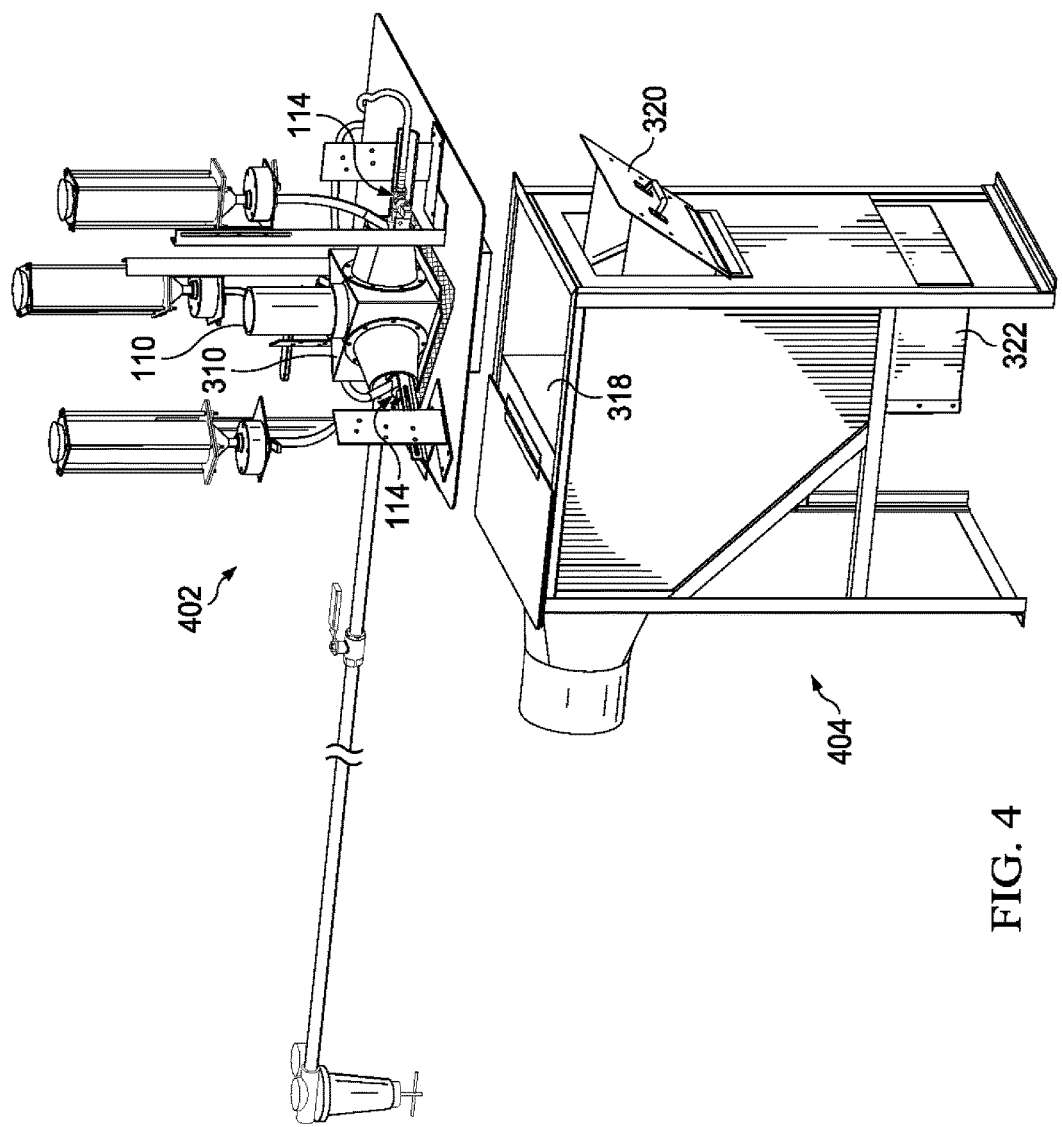
FIG. 4 is a schematic illustration of one embodiment of the invention depicting a nozzle assembly separated from a container assembly.
Figure 5:
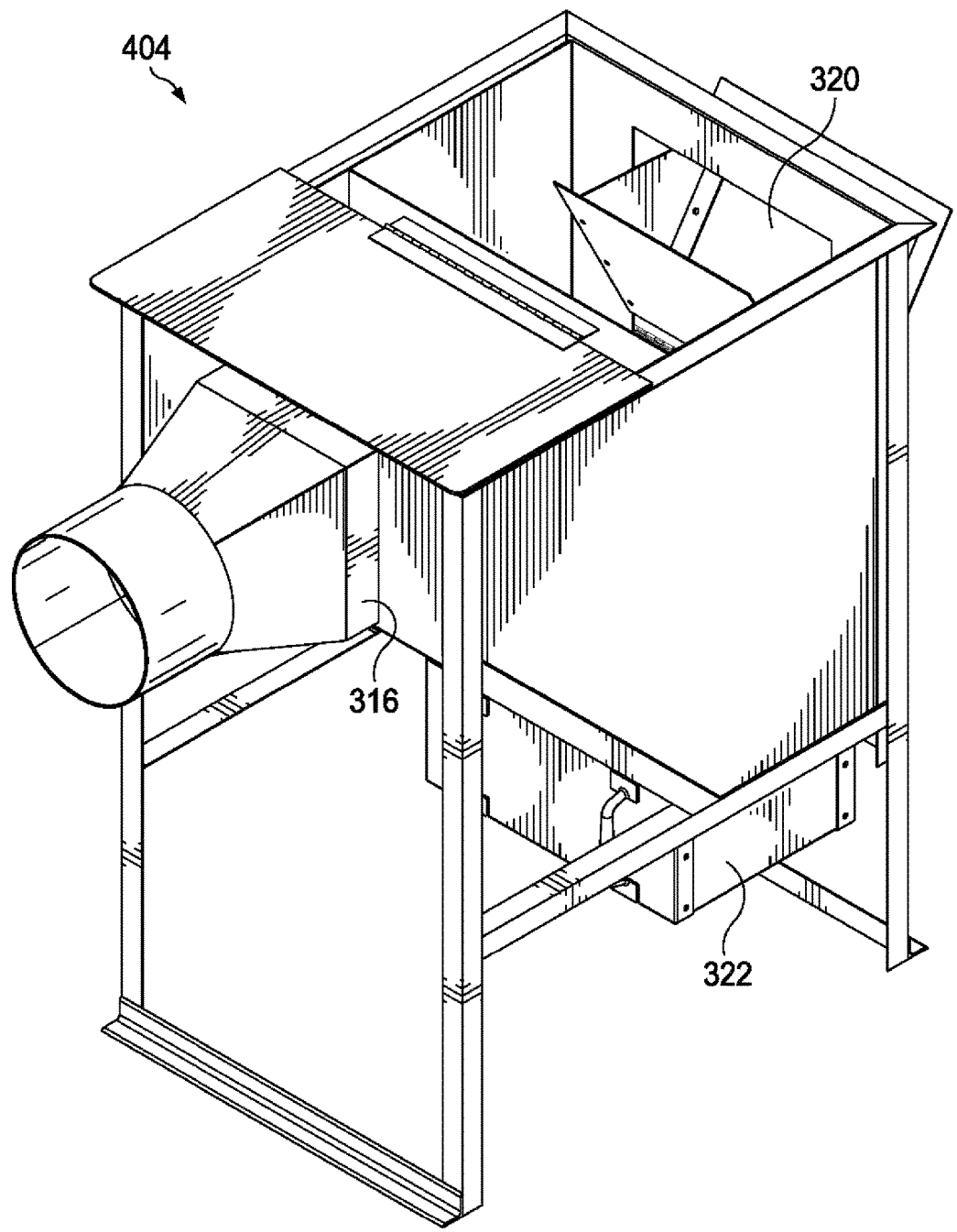
FIG. 5 is a schematic illustration of one embodiment of the invention depicting a front perspective view of the container assembly of FIG. 4.
Figure 10:
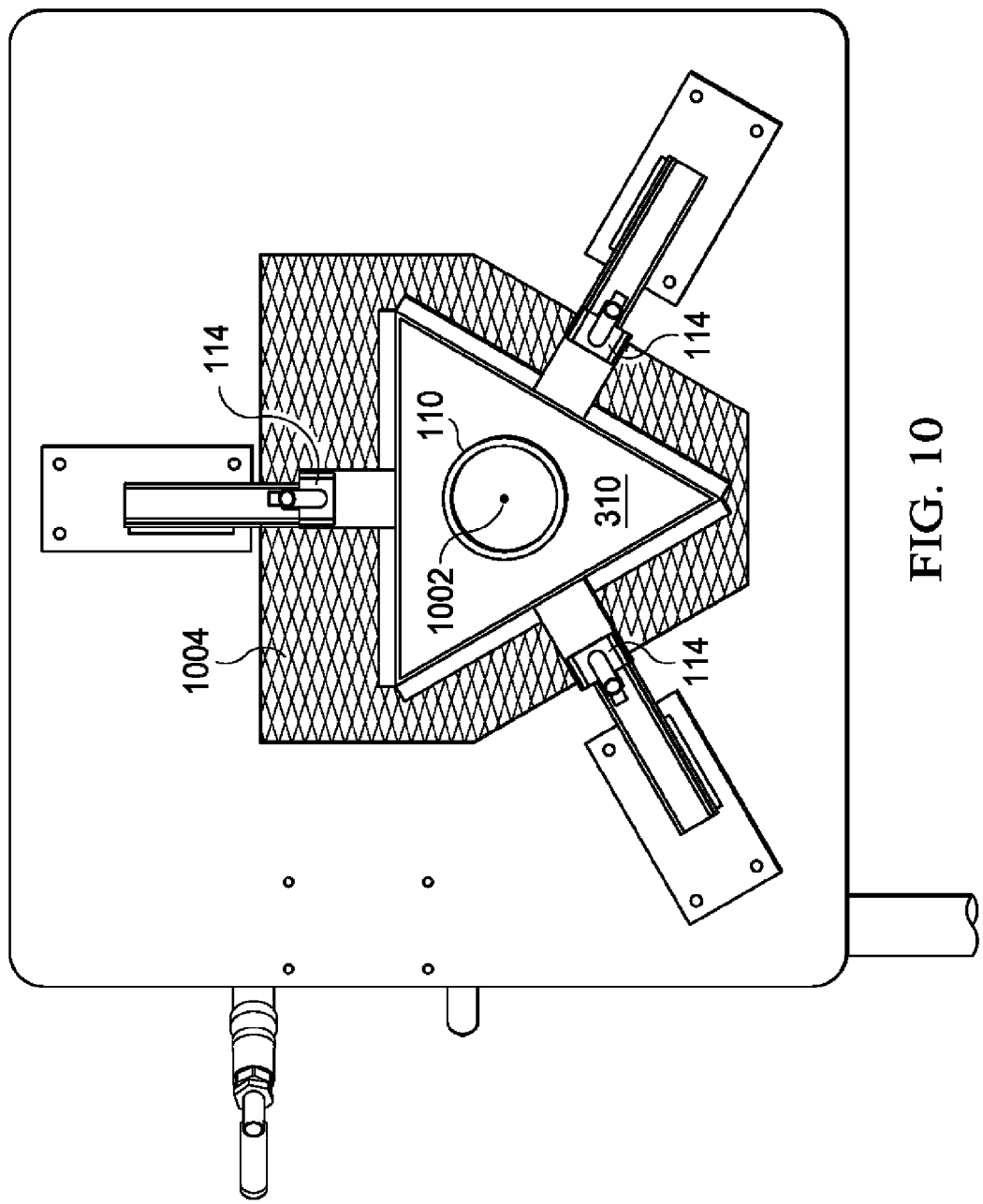
FIG. 10 is a schematic illustration of one embodiment of the invention depicting a top view of the nozzle assembly of FIG. 4.
Figure 11:
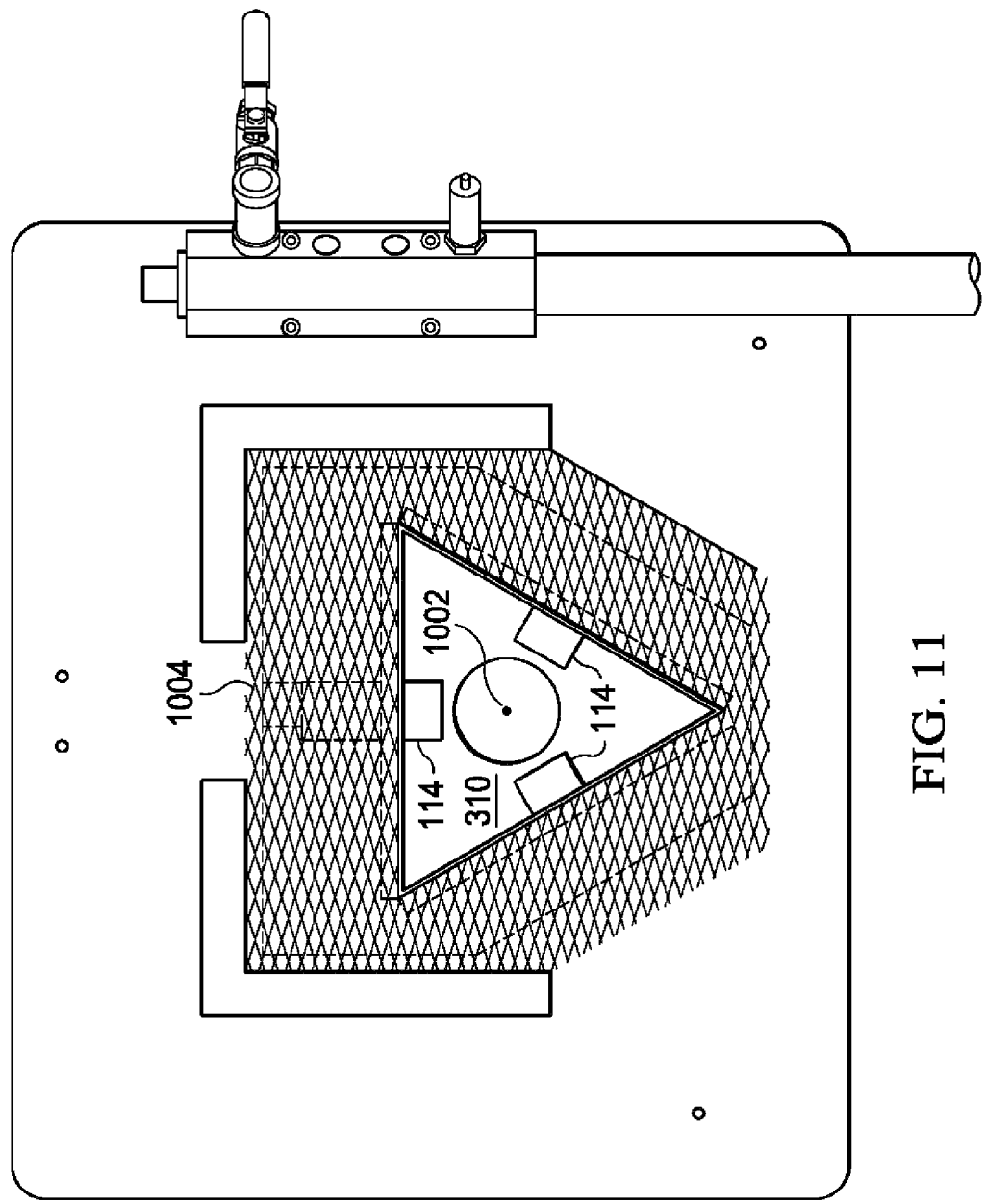
FIG. 11 is a schematic illustration of one embodiment of the invention depicting a bottom view of the nozzle assembly of FIG. 4.
Figure 13:
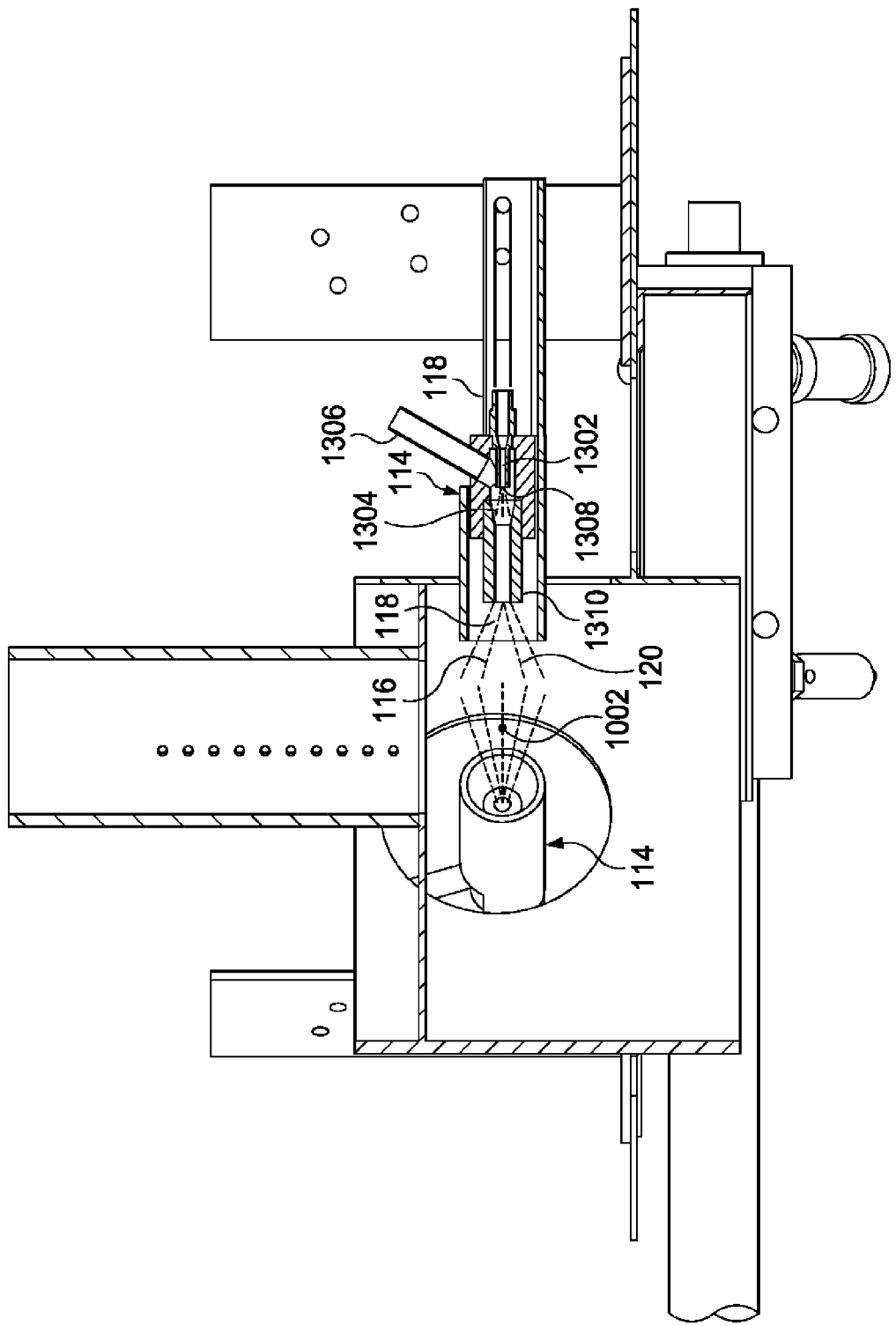
FIG. 13 is a schematic illustration of one embodiment of the invention depicting a cross-section of the nozzle assembly of FIG. 4.

Although some embodiments of the invention comprise one and only one attrition nozzle 114, the embodiment shown in FIG. 1 comprises a plurality of attrition nozzles 114 positioned and oriented to direct a plurality of abrasive streams 116 at a target point 1002 (depicted, for example, in FIGS. 10, 11, and 13). As illustrated, each attrition nozzle 114 is positioned and oriented to direct the abrasive stream 116 into contact with the food product 104. As shown in FIG. 3, an attrition nozzle 114 or plurality of attrition nozzles 114 can also comprise a valve 328 for controlling the velocity of a fluid 118 and thereby the velocity of the abrasive stream 116 at an outlet 140 of the attrition nozzle 114.

As illustrated in the embodiment of FIG. 3, a plurality of attrition nozzles 114 can be arranged in a ring and evenly spaced from each other. For example, one embodiment comprises at least 3, 4, 5, 6, or even more attrition nozzles 114 depending on the surface area of the food product 104 over which attrition is desired.

In one embodiment, the attrition nozzles 114 can be arranged to form an equilateral triangle (e.g., with each attrition nozzle 114 at the vertex of the triangle or with each attrition nozzle 114 at the centerpoint of a side of the equilateral triangle). Nonetheless, in some embodiments, the attrition nozzles 114 are spaced unevenly. For example, differences in position and orientation of the attrition nozzles 114 can be addressed, as applicable, by aiming each attrition nozzle 114 (and therefore each abrasive stream 116) at the food product 104 and/or increasing or decreasing the velocity of an abrasive stream 116 as it exits an attrition nozzle 114.

Additionally, in some embodiment, the attrition nozzles 114 all provide their respective abrasive streams 116 with a velocity (e.g., magnitude and direction) that acts to provide balanced velocity head on the food product 104. For example, in one embodiment, the abrasive streams 116, in combination, result in substantially no net force or torque on the food product 104. Furthermore, in one embodiment, any net torque or force on the food product 104 as a result of the abrasive streams 116 moves the food product 104 into a desired position and/or orientation or any net torque is not large enough to substantially move the position and/or orientation of the food product 104 away from a desired position and orientation. As an example, a desired position can be a position that is substantially centered in an attrition zone 112 between the attrition nozzles 114, and a desired orientation can be an orientation with a long dimension of the food product 104 oriented substantially parallel to the direction of movement 146 of the food product 104 through the attrition zone 112 or oriented substantially parallel to a central axis of the attrition zone 112.

With reference again to FIG. 1, in one embodiment, an attrition nozzle 114 can be positioned and oriented to provide an incident angle 122 between an average direction 124 of the abrasive stream 116 and the line 126 normal to the outer surface 102 of the food product 104. For example, FIG. 1 illustrates a point 128 of intersection where the average direction 124 of the abrasive stream 116 intersects the outer surface 102 of the food product 104. FIG. 1 also illustrates a line 126 normal to the outer surface 102 of the food product 104 at the point 128 of intersection. As illustrated in FIG. 1, the incident angle 122 is the angle between the average direction 124 of the abrasive stream 116 and the line 126 normal to the outer surface 102 of the food product 104.

Figure 12:
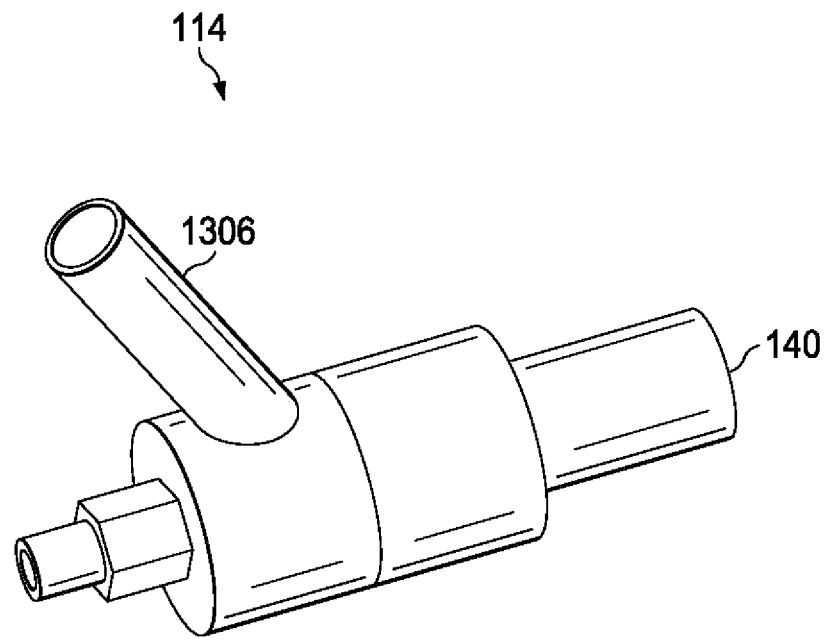
FIG. 12 is a schematic illustration of one embodiment of the invention depicting a nozzle of the nozzle assembly of FIG. 4.

With reference now to FIG. 3, FIG. 12, and the cross-section shown in FIG. 13, one embodiment of the invention comprises a fluid jet nozzle 1302, an abrasive conduit 1306, and an abrasive stream discharge nozzle 1310. For example, as shown in FIG. 13, an attrition nozzle 114 for the abrasive stream 116 comprises a fluid jet nozzle 1302 for providing a fluid jet 1304 inside the attrition nozzle 114. As illustrated, the abrasive conduit 1306 directs the abrasive 120 toward an outlet 1308 of the fluid jet nozzle 1302. An abrasive stream 116 is formed when the fluid jet 1304 draws the abrasive 120 through the abrasive conduit 1306 and into the fluid jet 1304. Then, the abrasive stream 116 is discharged through the abrasive stream discharge nozzle 1310.

As illustrated, for example, in FIGS. 1, 3 and 13, the embodiment comprises a path 324 of fluid communication for the fluid 118 between a fluid source 304 for the fluid and the fluid jet nozzle 1302. Similarly, the embodiment comprises a path 326 of fluid communication for the abrasive 120 between an abrasive source 306 for the abrasive 120 and the abrasive conduit 1306.

Figure 8:
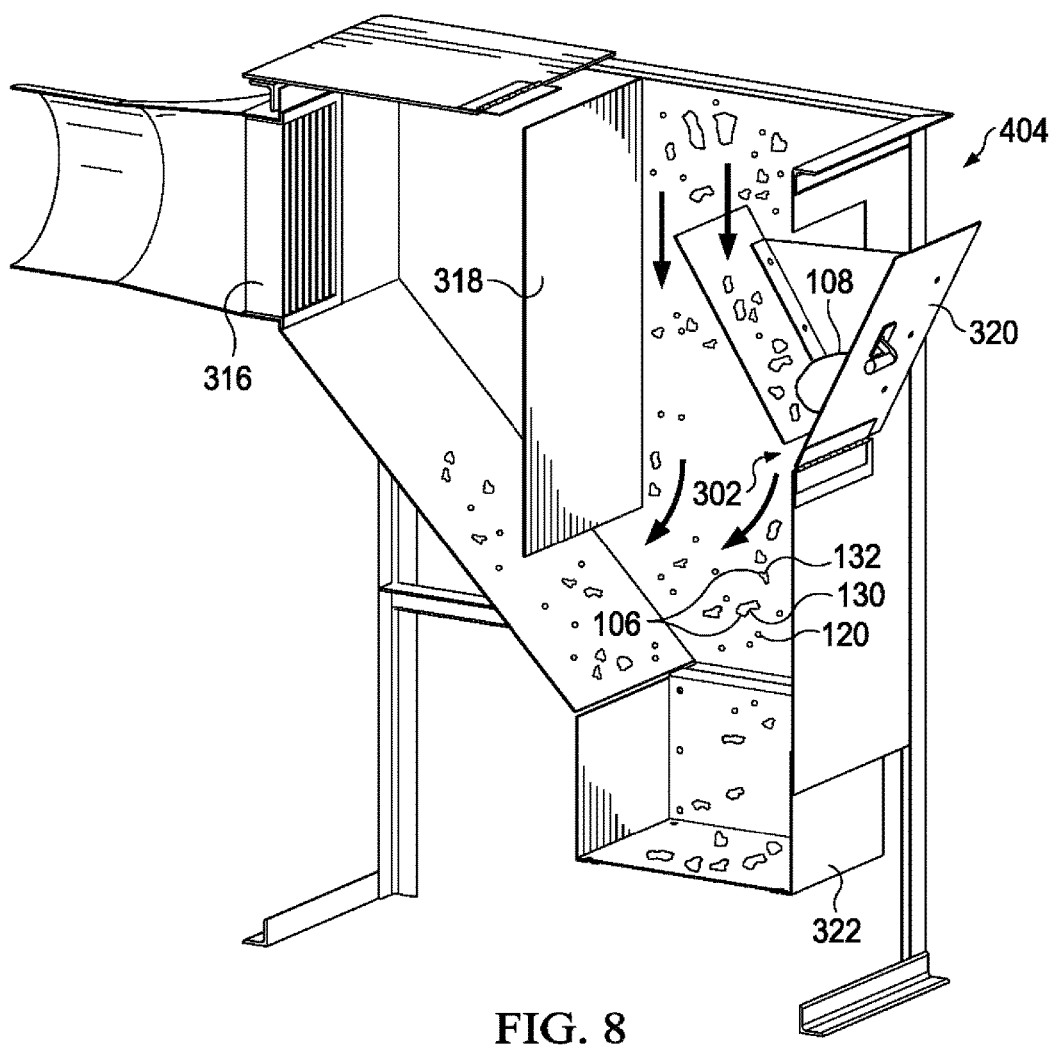
FIG. 8 is a schematic illustration of one embodiment of the invention depicting a cross-section of the container assembly of FIG. 4.
Figure 9:
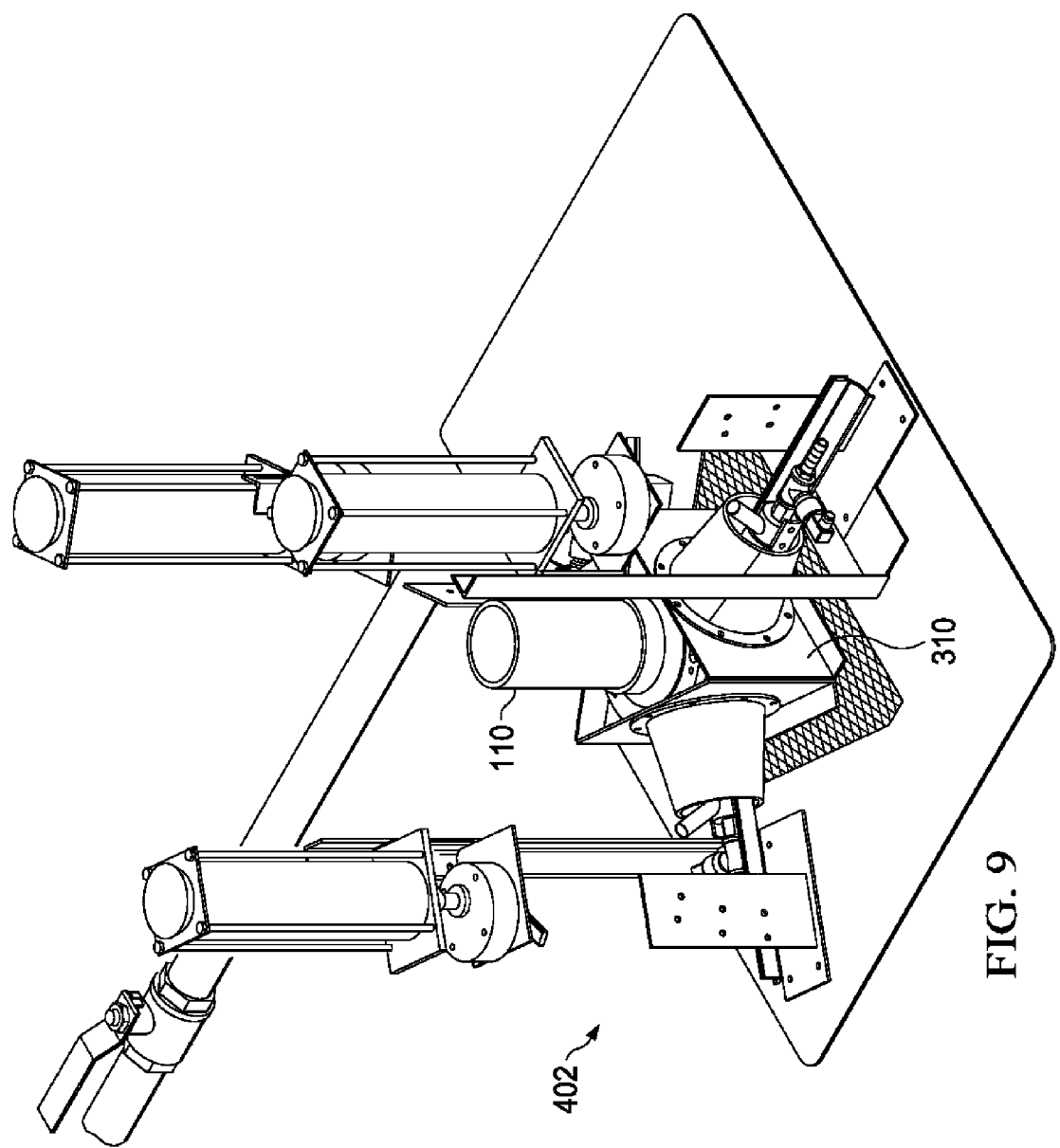
FIG. 9 is a schematic illustration of one embodiment of the invention depicting a back perspective view of the nozzle assembly of FIG. 4.

As illustrated in FIG. 8, one embodiment of the invention comprises a remainder separator 302 for substantially separating the remainder 108 of the food product 104 from the removed portion 106 of the food product 104. As illustrated, the remainder separator 302 comprises a size based solid-solid separator, for example, an opening (e.g., a slot) or plurality of openings (e.g., a screen). As shown in FIG. 8, the opening is large enough that the abrasive 120 and removed portion 106 of the food product 104 can pass through the opening. However, the opening is also small enough that the remainder 108 of the food product 104 cannot pass through the opening. Accordingly, in some embodiments, the remainder separator 302 can be used to simultaneously separate the remainder 108 of the food product 104 from both the abrasive 120 and the removed portion 106 of the food product 104. In some embodiments, at least 50%, at least 70%, at least 80%, or at least 90% of the removed portion 106 of the food product 104 and the abrasive 120 used to remove the removed portion are separated from the remainder 108 of the food product.

Turning to FIG. 3, one embodiment of the invention comprises a fluid source 304 in fluid communication with the attrition nozzle 114. Examples of a fluid source 304 include a tank, a vessel, the atmosphere, a supply line, a utility line, etc. The embodiment of FIG. 3 also comprises a pressurizer 308, for example, a pump or a compressor to provide pressurized fluid 118. Furthermore, some embodiments comprise a vessel that is pressurized to provide pressurized fluid 118.

The illustrated embodiment of FIG. 3 also comprises an abrasive source 306 in fluid communication with the attrition nozzle 114. Examples of an abrasive source 306 include a hopper, a tank, a vessel, a supply line, etc. As illustrated, the embodiment comprises an abrasive source 306 for each of a plurality of attrition nozzles 114.

Although one and only one abrasive source 306 can be used, using a plurality of abrasive sources 306 can help to reduce the risk of the abrasive 120 clogging. For example, using a plurality of abrasive sources 306 can help to minimize the distance between the outlet of an abrasive source 306 and the outlet 140 of an attrition nozzle 114 for the abrasive stream 116. This, in turn, can help minimize the distance over which the pressure of the abrasive 120 decreases from a higher value (e.g., atmospheric pressure plus static pressure) to a lower pressure (e.g., vacuum pressure caused by the fluid jet 1304 at the outlet of the abrasive conduit 1306), thereby increasing the velocity of the abrasive 120 over the distance and decreasing the risk of the abrasive 120 clogging.

Using a plurality of abrasive sources 306 can also help to more precisely and accurately control the amount of abrasive 120 in each of a plurality of abrasive streams 116 discharged by a plurality of attrition nozzles 114. For example, one and only one abrasive source 306 with a splitter can be used, but if the system for providing the abrasive streams 116 to the attrition zone 112 has any asymmetries, the abrasive 120 can be distributed unevenly unless additional controls are put in place. Accordingly, it can be more desirable to separately meter the abrasive 120 flowing to each abrasive stream 116. For example, the embodiment illustrated in FIG. 3 comprises an abrasive metering valve 312. Among other uses, in one embodiment, an abrasive metering valve 312 can be used to control a mass flow rate of the abrasive 120 to each of a plurality of attrition nozzles 114. In some embodiments, a mass flow rate of a substance (e.g., the abrasive 120) can be controlled indirectly by controlling a volumetric flow rate of the substance in light of a known density of the substance. In one embodiment, the abrasive metering valve 312 controls the amount of abrasive 120 fed to or mixed with the fluid 118 to form the abrasive stream 116. An example of an abrasive metering valve 312 is the BLASTMASTER® REGULATOR JR. abrasive metering valve 312 available from Marco, 701 East Boulevard, Deer Park, Tex. 77536, US.

As illustrated, for example, in FIGS. 3, 9, 10, and 11, one embodiment of the invention comprises an attrition chamber 310. For example, in some embodiments, the attrition chamber 310 protects the food product 104 from contamination. As another example, in some embodiments, the attrition chamber 310 protects operators or nearby items from exposure to the abrasive stream 116.

As illustrated, the embodiment in FIG. 3 also comprises a vacuum source 314. For example, the vacuum source 314 can be a blower. In the illustrated embodiment, the blower draws the fluid 118 (e.g., air) from the attrition chamber 310 through a filter 316 to provide a vacuum. In some embodiments, the vacuum source 314 provides a vacuum throughout the entire system (e.g., from the attrition chamber 310 to the inlet of the blower). For example, in one embodiment, the outlet of the blower is at atmospheric pressure, the inlet of the blower is at a pressure lower than atmospheric pressure and the inlet to the pressure system in fluid communication with the inlet of the blower (e.g., inlet to the attrition chamber 310, product positioner 110, or some other upstream component) is at atmospheric pressure. Accordingly, in one embodiment, from the inlet to the pressure system to the inlet of the blower, the pressure is below atmospheric pressure or under vacuum.

Using vacuum source 314 can be helpful to provide a vacuum in the product attrition chamber 310, a container assembly, or any other component of an embodiment downstream of the attrition chamber 310 and likely to be exposed to attrition byproducts 256 from the attrition chamber 310 (e.g., the removed portion 106 of the food product 104 or the abrasive 120). For example, providing a vacuum can be useful so solids (e.g., abrasive 120, and removed portion 106 of the food product 104) in the container assembly tend to remain within the container assembly, rather than escaping to the local environment, which is at a higher pressure (e.g., atmospheric pressure). This can help protect operators from inhaling solids, and thereby create a safer working environment.

Figure 7:
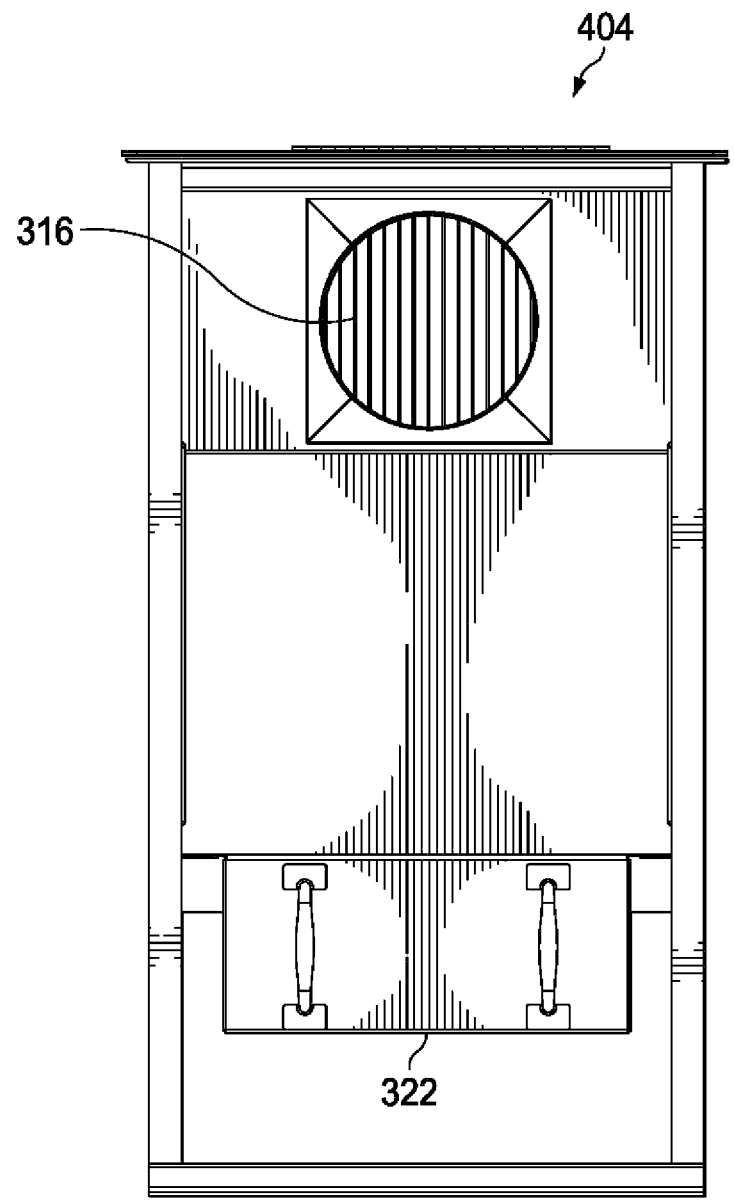
FIG. 7 is a schematic illustration of one embodiment of the invention depicting the container assembly of FIG. 4 from the front of the container assembly.

As illustrated, for example, in FIG. 3 and FIG. 7, one embodiment of the invention comprises a filter 316 (e.g., an inlet filter for the vacuum source 314). For example, the filter 316 can remove solids from the fluid 118 leaving the attrition chamber 310 and can remove solids before they reach the vacuum source 314. In some embodiments, the filter 316 is placed as close to the attrition chamber 310 as possible to minimize the opportunity for entrained solids to escape into the environment.

Figure 6:
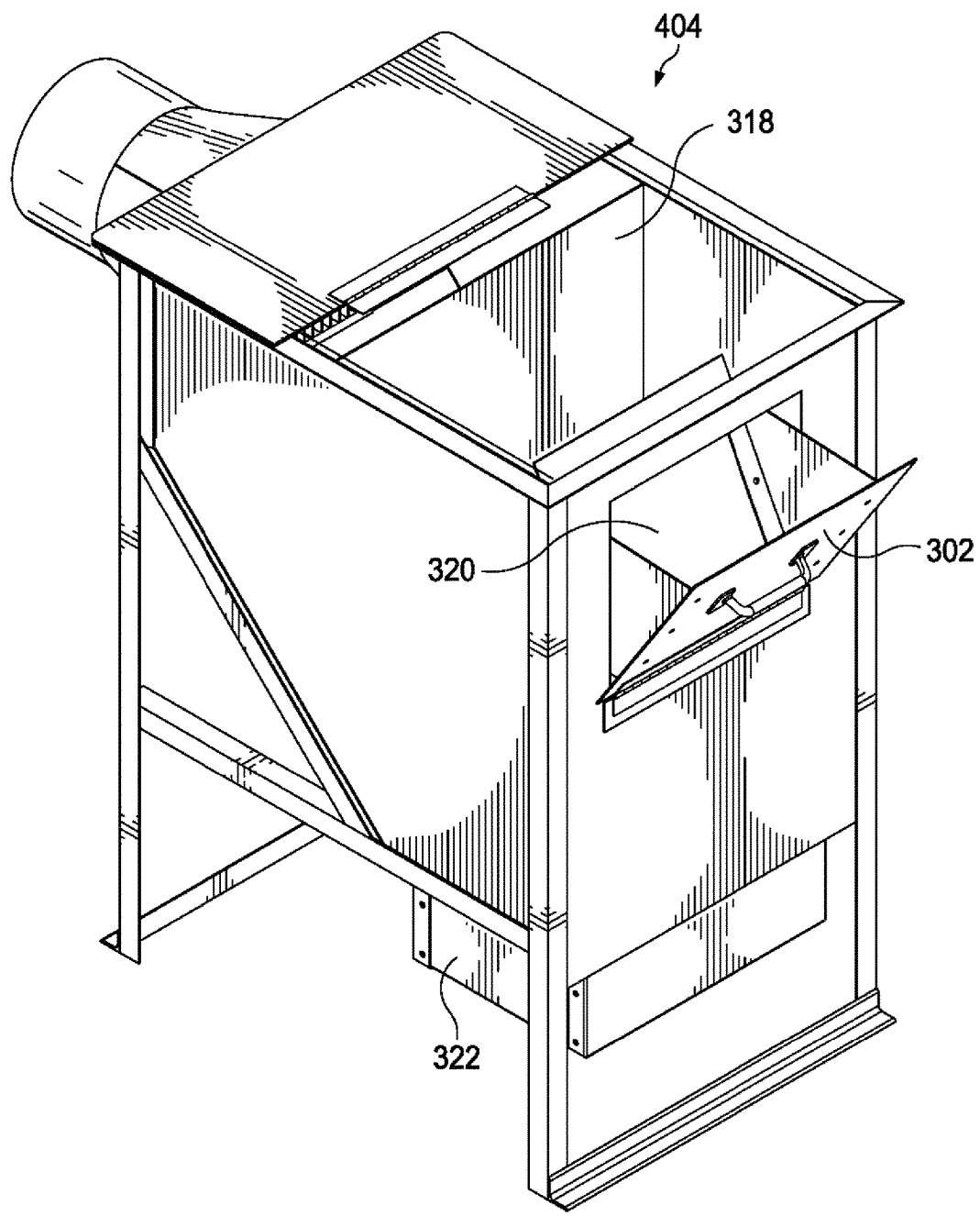
FIG. 6 is a schematic illustration of one embodiment of the invention depicting a side perspective view of the container assembly of FIG. 4.

As illustrated in FIGS. 6 and 8, one embodiment of the invention comprises a settling device (e.g., a baffle 318) to cause a change in the velocity (e.g., speed and/or magnitude) of the fluid 118 and thereby cause entrained solids (e.g., abrasive 120 and/or the removed portion 106 of the food product 104) to settle out of the fluid 118. As illustrated, a filter 316 is positioned after and proximate a settling device 318. The illustrated arrangement can be useful to reduce the load on the filter 316. Although, in some embodiments, a settling device can be used without a filter 316 or a filter can be used without a settling device. Furthermore, while one embodiment has been illustrated with a settling device (e.g., a baffle 318), in some embodiments, the settling device or baffle 318 is replaced with or is a mechanism for changing (e.g., decreasing) a velocity of solids entrained in the fluid relative to a velocity of the fluid so that the solids settle out of the fluid. For example, the mechanism can be a hydrocyclone or other density-based separation device, and the solids entrained in the fluid can be the abrasive and/or the removed portion of the food product. In some embodiments, after the solids pass by or through the mechanism, the solids are no longer entrained in the fluid. For example, in some embodiments, as a result of the mechanism, the direction and/or magnitude of the resultant force vector on the solids is different than the direction and/or magnitude of the resultant force vector on the fluid, thereby causing the solids to drop out of suspension in the fluid.

As illustrated in FIG. 8, after contacting the food product 104, the abrasive stream 116 (and any additional entrained solids, e.g., attrition byproducts 256 such as the removed portion of food product 104) is directed downward using the baffle 318. Furthermore, one embodiment comprises a post-attrition abrasive receiver 322 (e.g., a container or passive or active conveyor for the post-attrition abrasive 120 and other solids entrained in the fluid 118 that exits the attrition zone 112). For example, as the air passes the baffle 318, abrasive 120 and other entrained solids can settle out of the fluid 118 and into the post-attrition abrasive receiver 322. Afterwards, any entrained solids remaining in the fluid 118 can be drawn (e.g., upward) into a filter 316 at the inlet to the vacuum source 314 (e.g., a blower which can push the air back to the ambient environment). If the post-attrition abrasive receiver 322 comprises a container (e.g., a drawer, as illustrated, a basin, or a trough), the entrained solids that settle out of the fluid 118 can accumulate in the abrasive 120 receiver. Furthermore, if the abrasive 120 receiver is a conveyor (e.g., passive conveyor such as chute, or active conveyor, such as augers, an endless conveyor belt, etc.), the abrasive 120 and other entrained solids that settle out of the fluid 118 can be continuously conveyed to another location for further processing.

With reference again to FIGS. 3 and 8, one embodiment of the invention comprises a post-attrition food product receiver 320. Similar to the post-attrition abrasive receiver 322, the post-attrition food product receiver 320 can be a container or a passive or active conveyor, and the remainder 108 of the food product 104 can be continuously conveyed to another location for further processing. As illustrated, the post-attrition food product receiver 320 is a drawer.

As illustrated, for example, in FIGS. 4-7 and 9-11, some embodiments comprise a nozzle assembly 402 which can be separated from a container assembly 404. For example, in some embodiments, the nozzle assembly 402 comprises nozzles 114, a drop tube 110, an attrition chamber 310, and/or other components. As another example, in some embodiments, the container assembly 404 comprises a product receiver 320, a post-abrasive attrition receiver 322, a baffle 318, and/or other components.

As illustrated, for example, in FIG. 10, some embodiments comprise an air intake screen 1004. As illustrated, the nozzle assembly 402 comprises the air intake screen 1004. Nonetheless, in some embodiments, an air intake screen 1004 or similar openings are avoided to prevent the loss of vacuum provided by a vacuum source 314. For example, in some embodiments, the attrition chamber 310 or container assembly 404 and any other components in fluid communication with the vacuum source 314 are sealed against the environment to some extent (e.g., excluding an inlet for the food product, such as a drop tube 110). In some embodiments, this is done to prevent loss of vacuum and to prevent solid particles within the system from escaping to the local environment.

Figure 14:
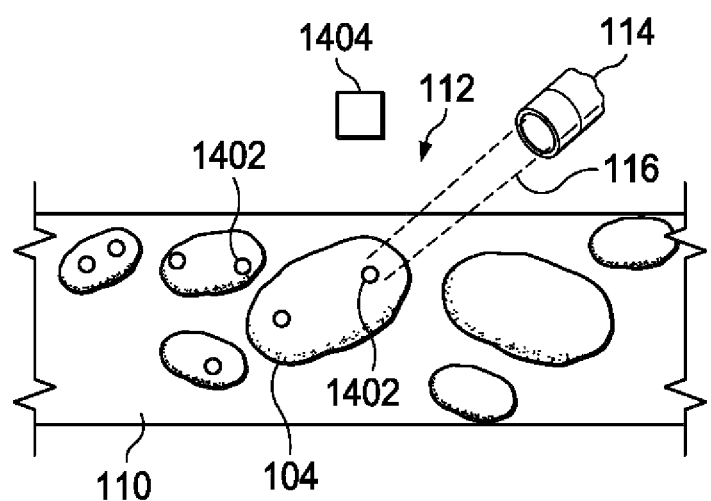
FIG. 14 is a schematic illustration of one embodiment of the invention depicting a mobile nozzle, a sensor, and a product positioner being used to remove a targeted outer surface feature from a food product.

One embodiment of the invention will now be described with reference to FIG. 14. FIG. 14 illustrates a product positioner 110 that comprises a chute, a conveyor, or tumbler (e.g., using augers). In some embodiments, the product positioner 110 actively or passively conveys the food product 104 to gives the food product a tumbling (e.g., random tumbling) motion. As the food product 104 is conveyed by the product positioner 110 into an attrition zone 112, at least one sensor 1404 detects the presence and position of a targeted outer surface feature 1402 of the food product. After detection, at least one nozzle 114 is positioned and oriented to discharge an abrasive stream 116 into contact with the targeted outer surface feature 1402 and thereby separate all or at least a portion of the targeted outer surface feature 1402 from the food product 104.

Figure 2:
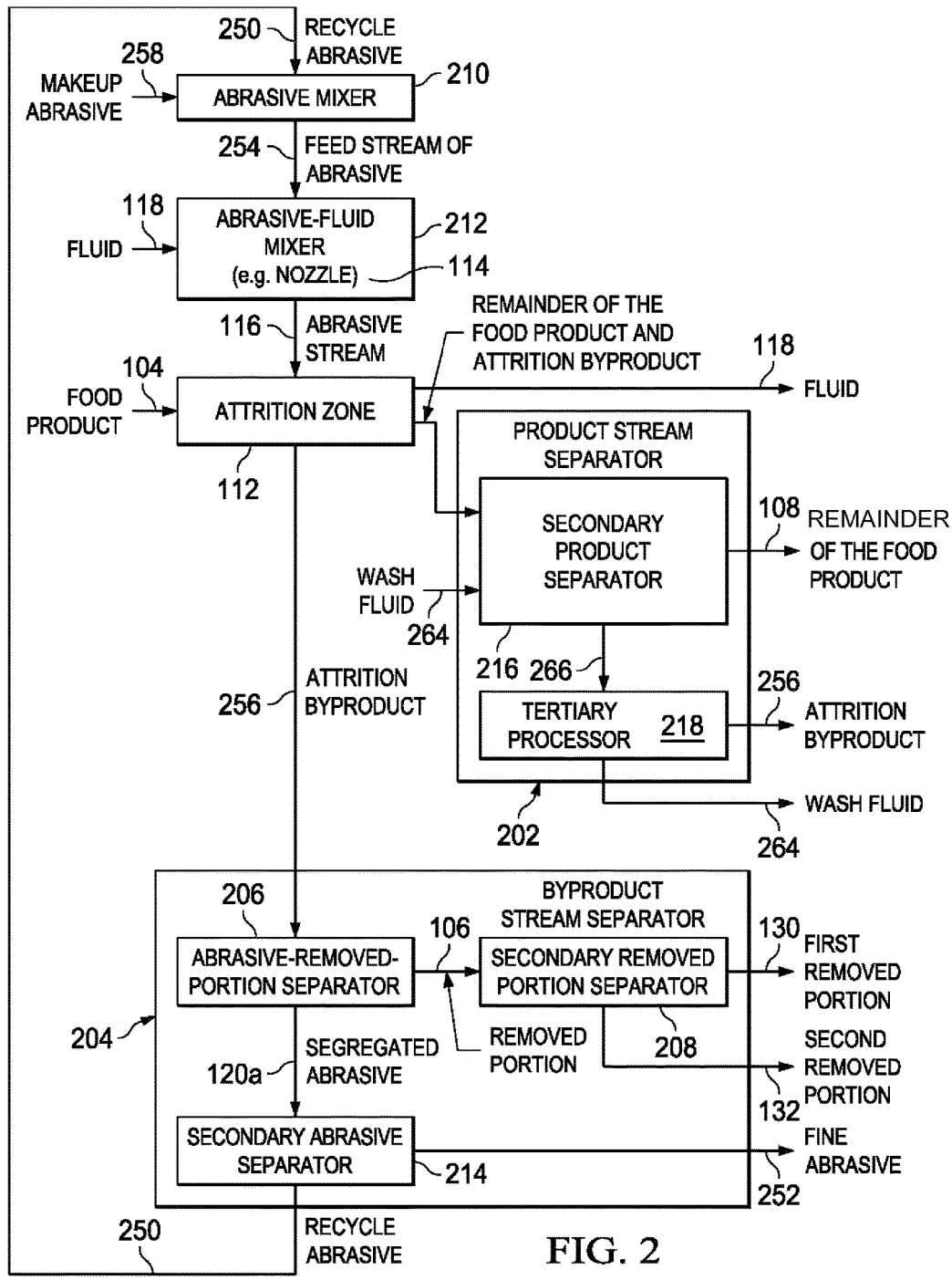
FIG. 2 is a schematic block flow diagram of one embodiment of the invention.

With reference to FIG. 2, one embodiment of the invention comprises a product stream separator 202 for further separating the remainder 108 of the food product 104 from the removed portion 106 of the food product 104 and the abrasive 120. In some embodiments, the product stream separator 202 can employ solvent-, kinetic-, size- and/or or density-based separation techniques. Examples include subjecting the food product 104 to a water wash, blowing with compressed air, vibration, and/or centrifugal acceleration, etc. Examples of a density separator include a hydrocyclone and a centrifugal separator.

With reference again to FIG. 2, one embodiment of the invention comprises a byproduct stream separator 204 for further separating at least two components selected from the group consisting of recycle abrasive 250, fine abrasive 252, a first removed portion 130 of the food product 104, and a second removed portion 132 of the food product 104. In some embodiments, the byproduct stream separator 204 comprises solvent-, kinetic-, size- and/or or density-based separator.

As illustrated in FIG. 2, some embodiments of the invention comprise an abrasive-removed-portion separator 206 for substantially separating the removed portion 106 of the food product 104 from the abrasive 120 to provide a segregated abrasive 120a. As an example, in some embodiments, at least 50%, at least 70%, at least 80%, or at least 90% of the removed portion 106 present (e.g., mixed, or combined) with the abrasive 120 is separated from the abrasive. Additionally, as shown, some embodiments of the invention comprise a secondary removed portion separator 208 for substantially separating a desired portion of the removed portion from another part of the removed portion. In some embodiments, at least 50%, at least 70%, at least 80%, or at least 90% of the other part of the removed portion 106 is separated from the desired portion of the removed portion. An example of a desired portion is the second removed portion 132 (e.g., starch) illustrated in FIGS. 1 and 2. An example of another part of the removed portion is the first removed portion 130 (e.g., peel) as illustrated in FIGS. 1 and 2.

One embodiment of the invention will now be described with reference to FIG. 2. FIG. 2 depicts a block flow diagram illustrating a method for causing attrition to an outer surface 102 of a food product 104 to provide a removed portion 106 of the food product 104 and a remainder 108 of the food product 104.

As illustrated in FIG. 2, an abrasive-fluid mixer 212 (e.g., an attrition nozzle 114) is fed a fluid 118 and a feed stream 254 of the abrasive 120. Additionally, in the illustrated embodiment, the abrasive-fluid mixer 212 provides an abrasive stream 116.

In one embodiment, the abrasive stream 116 is fed to the attrition zone 112 along with a food product 104, and the attrition zone 112 produces a remainder 108 of the food product 104 and an attrition byproduct (e.g., a removed portion 106 of the food product 104 and the abrasive 120).

Furthermore, in the embodiment illustrated in FIG. 2, the remainder 108 of the food product 104 and some of the attrition byproduct 256 is fed to a product stream separator 202. In some embodiments, the product stream separator 202 is also fed a wash fluid 264 (e.g., gas, liquid, air, water). The product stream separator 202 provides a remainder 108 of the food product 104 separated from the attrition byproduct 256. In some embodiments, the product stream separator 202 also separates the wash fluid 264 from the remainder 108 of the food product 104 and the attrition byproduct 256.

As illustrated in FIG. 2, the product stream separator 202 comprises a secondary product separator 216 and a tertiary processor 218. For example, in some embodiments, the secondary product separator 216 and/or tertiary processor 218 comprises a solvent-, kinetic-, size- and/or or density-based separator. For example, in one embodiment the secondary product separator 216 is fed the remainder 108 of the food product 104 and the attrition byproduct 256, and the secondary product separator 216 separates the remainder 108 of the food product 104 from secondary product separation byproducts 266 (e.g. attrition byproduct 256 and/or wash fluid 264).

In the embodiment of FIG. 2, the tertiary processor 218 is fed the secondary product separation byproducts 266 and separates the attrition byproduct 256 from the wash fluid 264. In some embodiments, the attrition byproduct 256 is further separated, for example, similarly to the attrition byproduct 256 that is fed to an abrasive-removed-portion separator 206 in FIG. 2. In some embodiments, the attrition byproduct 256 from the tertiary processor 218 can also be fed to the abrasive-removed-portion separator 206.

As illustrated in FIG. 2, a byproduct stream separator 204 is fed attrition byproduct 256 from the attrition zone 112 and separates the attrition byproduct to provide a first removed portion 130 (e.g., peel), a second removed portion 132 (e.g., starch), fine abrasive 252, and/or recycle abrasive 250. In some embodiments, the byproduct stream separator 204 comprises a solvent-, kinetic-, size- and/or or density-based separator. In one embodiment, the byproduct stream separator 204 comprises a density-based separator (e.g., a hydrocyclone or centrifugal separator). In some embodiments, the byproduct stream separator 204 comprises an abrasive-removed-portion separator 206, a secondary removed portion separator 208, and/or a secondary abrasive separator 214. For example, in some embodiments, the abrasive-removed-portion separator 206, the secondary removed portion separator 208, and/or secondary abrasive separator 214 comprise a solvent-, kinetic-, size- and/or or density-based separator.

As illustrated in the embodiment of FIG. 2, the abrasive-removed-portion separator 206 is fed attrition byproduct 256 from the attrition zone 112 and separates the removed portion 106 of the food product 104 from the abrasive 120 to provide a segregated abrasive 120a.

As illustrated in the embodiment of FIG. 2, the segregated abrasive 120a comprises recycle abrasive 250 and fine abrasive 252. An example of recycle abrasive 250 is abrasive 120 that is at least as large as a desired size threshold (e.g., average particle size of 50-2000 µm) for reuse in the abrasive stream 116. Although smaller particles can also be used, such particles (e.g., with smaller masses) can require prohibitively high velocities to provide a desired amount of momentum and/or kinetic energy for removing the outer surface 102 of a food product 104. An example of fine abrasive is abrasive 120 that is smaller than the desired size threshold for reuse in the abrasive stream 116). As illustrated the segregated abrasive 120a is fed to a secondary abrasive separator 214 to separate the recycle abrasive 250 from the fine abrasive 252.

In some embodiments, the recycle abrasive 250 and makeup abrasive 258 are fed to an abrasive mixer 210 to provide a feed stream 254 of abrasive 120, which is in turn fed to the abrasive-fluid mixer 212, along with fluid 118, to provide an abrasive stream 116. Furthermore, in some embodiments, the fine abrasive 252 is further processed (e.g., by dissolving, recrystallization, and/or drying) to provide recycle abrasive 250.

In some embodiments, as illustrated in FIG. 2, the removed portion 106 of the food product 104 comprises a first removed portion 130 (e.g., peel) and a second removed portion 132 (e.g., starch). Furthermore, in some embodiments, the removed portion 106 of the food product 104 from the abrasive-removed-portion separator 206 is fed to a secondary removed portion separator 208 to separate the second removed portion 132 (e.g., starch) from the first removed portion 130 (e.g., peel). In some embodiments, if the second removed portion 132 is being used as an abrasive 120, the second removed portion 132 can be recycle abrasive 250 or can be processed to provide recycle abrasive 250.

Figure 15:
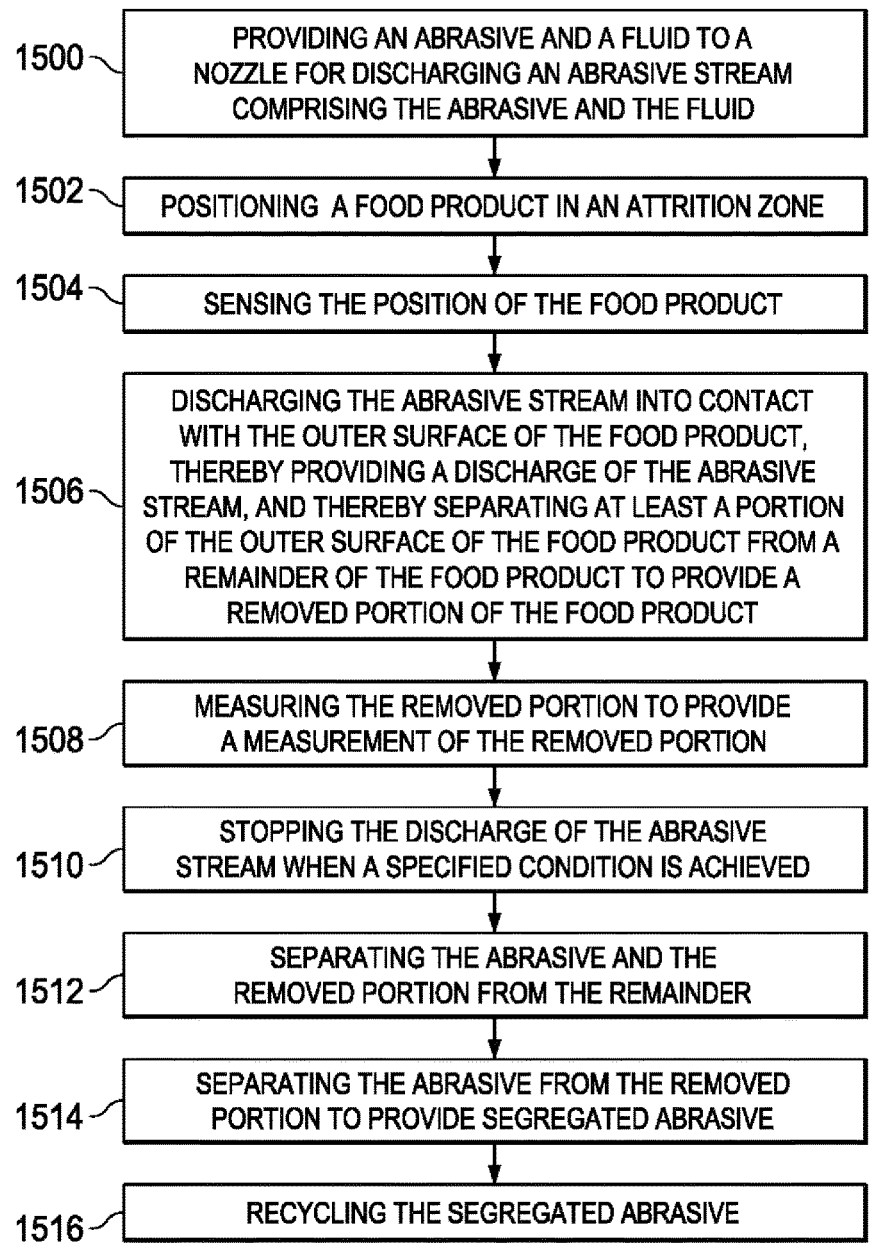
FIG. 15 is a flow chart depicting method steps for one embodiment of the invention.

An embodiment of the invention will now be described with reference to FIG. 15. FIG. 15 depicts a flow chart for a method for causing attrition to an outer surface 102 of a food product 104 to provide a removed portion 106 of the food product 104 and a remainder 108 of the food product 104. As illustrated, the method comprises several steps.

First, in a providing step 1500, an abrasive 120 and a fluid 118 are provided to an attrition nozzle 114 for discharging an abrasive stream 116 comprising the abrasive 120 and the fluid 118. In one embodiment, the feed stream 254 of the abrasive 120 comprises makeup abrasive 258 and/or recycle abrasive 250. In one embodiment, the abrasive 120 comprises a hardness at least as large as a hardness of the outer surface 102 of the food product 104. In one embodiment, the abrasive 120 comprises a hardness at least as large as a hardness of the removed portion 106 of the food product 104. In one embodiment, the abrasive 120 comprises a hardness of at least about 5 Mohs. In one embodiment, it is desirable to use a harder solid for the abrasive 120 because a collision involving a harder solid tends to more closely resemble an inelastic collision and transfer more kinetic energy to the food product 104 on contact. In one embodiment, it is desirable to use a harder solid for the abrasive 120 because a collision involving a harder solid tends to more closely resemble an inelastic collision (i.e., a collision in which kinetic energy is conserved) and transfer more kinetic energy to the food product 104 on contact with an abrasive 120 possessing a given mass and momentum. Furthermore, a greater rate of transfer of kinetic energy can be desirable, for example, to remove more of an outer surface 102 of the food product 104 after contact with the abrasive 120.

In one embodiment, it is desirable for the abrasive 120 to have a higher roughness (e.g., root mean square roughness), to have a sphericity that is less than 1 or an aspect ratio that is not equal to one. These attributes can be desirable as they tend to result in greater removal of the outer surface 102 of the food product 104 if other factors impacting removal remain constant. As an example, one embodiment comprises an average sphericity of 0.5-1.0, less than 0.9, less than 0.8, less than 0.7, or less than 0.6. As another example, one embodiment comprises abrasive with an average aspect ratio of 0.5-1.0. An illustration is useful to understand the aspect ratio. First, assume a particle has a constant density and an average cross-sectional area. Furthermore, assume that the cross-sectional area has an area-weighted centerpoint co-located with the center of mass of the cross-sectional area. A plurality of lines with end points on the perimeter of the cross-sectional area can be drawn through the center point. An example of the average aspect ratio as used herein is the shortest line in the plurality of lines divided by the longest line in the plurality of lines.

In one embodiment, the abrasive has an average particle size of at least 20 µm. In one embodiment, the abrasive has an average particle size of 20-20,000 µm. For example, as used herein, particle size for a particle refers to the diameter of a sphere having the same surface area as the particle. It can be desirable for a particle to have at least a minimum particle size. For example, given a particle density, the mass of the particle is related to the particle size. Furthermore, to provide a desired kinetic energy and/or momentum, a particle with a smaller mass must be moving faster, and accelerating a particle to very high rates of speed can be impractical. On the other hand, a particle with more mass can provide a desired kinetic energy and/or momentum while traveling at a slower speed.

In one embodiment, the abrasive 120 comprises or consists of an inexpensive, readily available solid material. In one embodiment, the abrasive 120 comprises or is salt (e.g., NaCl) and/or starch (e.g., vegetable starch, tuber starch, potato starch).

In one embodiment, the fluid 118 comprises or is an inexpensive, readily available liquid or gas. In one embodiment the fluid 118 comprises, consists essentially of, or is air and/or water.

In one embodiment, a mass or volumetric flow rate of the abrasive 120 in the abrasive stream 116 is to some extent controlled separately from a mass or volumetric flow rate of the fluid 118 in the abrasive stream 116. For example, this can be useful to ensure that the abrasive 120 is entrained in the fluid 118 in the abrasive stream. As an example, fluid or abrasive particle characteristics (e.g., density, size, viscosity, etc.) can be selected to result in a desired abrasive speed given a particular fluid speed.

In one embodiment, a ratio of the linear velocity of the abrasive 120 to the fluid 118 is controlled, for example, so that the abrasive 120 remains entrained in the fluid 118 in the abrasive stream 116.

In one embodiment, a linear velocity of the abrasive 120 and/or the fluid 118 is controlled, for example, so that the rate at which the abrasive stream 116 transfers momentum and/or kinetic energy to the food product 104 is sufficient to separate the removed portion 106 of the food product 104 from a remainder 108 of the food product 104. Furthermore, in one embodiment, the abrasive stream 116 remains in contact with the food product 104 for a controlled amount of time. For example, the controlled amount of time can be an amount of time sufficient to transfer total amounts of momentum and/or kinetic energy to the food product 104 to separate a desired amount of the removed portion 106 of the food product 104 from a remainder 108 of the food product 104. As another example, the linear velocity of the abrasive 120 and the fluid 118 can be controlled to provide the abrasive stream 116 with a desired velocity pressure head at an outlet 140 of an attrition nozzle 114 for discharging the abrasive stream 116.

Second, in a food product 104 positioning step 1502, a food product 104 is positioned in an attrition zone 112. For example, in one embodiment the attrition zone 112 comprises or consists of a discharge path 120 of the abrasive stream 116 from an attrition nozzle 114 (e.g., stationary attrition nozzle 114). As another example, in one embodiment the attrition zone 112 comprises or consists of a space within the discharge scope of a mobile (e.g., robotic) attrition nozzle 114 that is capable of changing a position of the attrition nozzle 114, an orientation of the attrition nozzle 114, and/or a velocity (e.g., speed and direction) of the abrasive stream 116.

In one embodiment, the positioning the food product 104 in the attrition zone 112 comprises allowing the food product 104 to fall into the attrition zone 112, or placing, dropping, or conveying the food product 104 into the attrition zone 112. For example, the food product 104 could be placed by a robotic arm, fall or be dropped through a drop tube, or be conveyed by an endless conveyor belt, auger, or tumbler.

In one embodiment, the food product 104 is dropped and/or falls from a minimum elevation above the attrition zone 112 so the velocity of the food product 104 through the attrition zone 112 is minimized and the time that the food product 104 spends in the attrition zone 112 is maximized. For example, in one embodiment, the food product 104 is dropped from a minimum elevation above the attrition zone 112 to provide the food product 104 with a sufficient velocity to pass through an abrasive stream 116 or a plurality of abrasive streams 116. For example, depending on the velocity of the at least one abrasive stream 116, the food product 104 can lack sufficient velocity to pass through the at least one abrasive stream 116 and thus be suspended by the at least one abrasive stream 116. Among other options, this issue can be addressed by using an incident angle 122 of the abrasive stream 116 to accelerate or decelerate the food product 104. An example of an incident angle 122 is the angle between the direction of the abrasive stream 116 and a line 126 normal (e.g., perpendicular) to the outer surface of the food product 104 at the point 128 of intersection where the abrasive stream 116 will intersect the surface of the food product 104.

In one embodiment, the abrasive stream 116 is provided at an incident angle 122 to the outer surface 102 of the food product 104 to accelerate the food product 104. For example, in one embodiment, to prevent suspension of the food product 104, at least one attrition nozzle 114 for the at least one abrasive stream 116 can be angled in a direction of movement 144 of the food product 104 as the food product 104 approaches the attrition zone 112. For example, the at least one attrition nozzle 114 can be directed slightly downward (e.g., 0-20 or 0-10 degrees away from horizontal).

Alternatively, in one embodiment, the abrasive stream 116 is provided at an incident angle 122 to the outer surface 102 of the food product 104 to decelerate the food product 104. For example, in one embodiment, in order to slow down a food product 104, at least one attrition nozzle 114 for the at least one abrasive stream 116 can be angled opposite a direction of movement 144 of the food product 104 as the food product 104 approaches the attrition zone 112. For example, the at least one attrition nozzle 114 can be directed slightly upward (e.g., 0-20 or 0-10 degrees away from horizontal).

In one embodiment, a sufficient rate of kinetic energy and/or a sufficient sum of kinetic energy is imparted to the outer surface 102 of the food product 104 by the abrasive 120 to separate at least a portion (e.g., a first removed portion 130) of the outer surface 102 of the food product 104 from the remainder 108 of the food product 104 to provide the removed potion of the food product 104. An example of a rate of kinetic energy imparted is an amount of kinetic energy imparted per time period. An example of a sum of kinetic energy imparted is a rate of kinetic energy imparted multiplied by the duration of time that the rate is imparted.

In one embodiment, a sufficient rate of momentum imparted to the outer surface 102 of the food product 104 by the abrasive 120 to separate at least a portion (e.g., a first removed portion 130) of the outer surface 102 of the food product 104 from the remainder 108 of the food product 104 to provide the removed potion of the food product 104. An example of a rate of momentum imparted is an amount of momentum imparted per time period. An example of a sum of momentum imparted is a rate of momentum imparted multiplied by the duration of time that the rate is imparted.

In one embodiment, at least a portion (e.g., a first removed portion 130) of the outer surface 102 of the food product 104 at a point on the outer surface 102 of the food product 104 spends sufficient time in contact with the abrasive stream 116 to be separated from the remainder 108 of the food product 104 to provide the removed portion of the food product 104. For example, the amount of time that the food product 104 spends in contact with the abrasive 120 can be controlled by controlling the velocity of the food product 104 as it passes through the attrition zone 112. In turn, the velocity of the food product 104 can be controlled, for example, by the elevation of the food product 104 above the attrition zone 112 when it is dropped, or the velocity with which the food product 104 is conveyed through the attrition zone 112. The velocity of the food product 104 through the attrition zone 112 can also be controlled by the velocity (speed and direction) of at least one abrasive stream 116 in the attrition zone 112. As another example, the amount of time that the food product 104 spends in contact with the abrasive 120 can also be controlled by increasing or decreasing the time for which an abrasive stream 116 is discharged while the food product 104 is in the attrition zone 112. Additionally, the time a food product 104 spends in the attrition zone can be controlled by increasing (or decreasing) the diameter of the nozzle or increasing (or decreasing) the attrition nozzle-to-product distance 138 to create a larger (or smaller) cross-sectional area for the abrasive stream 116. For example, given a food product 104 moving through the attrition zone 112 at a constant speed, if the cross-sectional area of the abrasive stream 116 is increased, the food product will spend more time in the attrition zone and in contact with the abrasive stream.

Third, in a product sensing step 1504, the position of the food product 104 is sensed using a sensor 1404 (e.g. using an ultrasonic, laser, optical, vision, or pneumatic sensor), for example, as illustrated in FIG. 14. In one embodiment, a relative position of the food product 104 to a target point 1002 can be determined. Furthermore, in one embodiment, the relative position of a food product 104 to at least one attrition nozzle 114 can be determined. For example, if the food product 104 is too close to the at least one attrition nozzle 114, too far from the at least one attrition nozzle 114, or positioned sub-optimally for attrition given the orientation and position of the at least one attrition nozzle 114, feed forward control can be used to change the velocity (e.g., direction and speed) of at least one abrasive stream 116 at the respective outlet of the at least one attrition nozzle 114. Furthermore, at least one attrition nozzle 114 can be repositioned and/or reoriented. As another example, the pressure drop experienced by the fluid 118 and/or abrasive stream 116 before exiting the attrition nozzle 114 can be increased or decreased (e.g., by opening or closing a valve). Additionally, an air ring can be used to both sense position of food product 104 and position it.

In some embodiments, sensing the position of the food product 104 is used to determine when the food product 104 will reach an attrition zone 112.

Fourth, in a discharging step 1506, the abrasive stream 116 is discharged (e.g., from an attrition nozzle 114) into contact with the outer surface 102 of the food product 104, thereby providing a discharge of the abrasive stream 116, and thereby separating at least a portion (e.g., a first removed portion 130) of the outer surface 102 of the food product 104 (e.g., peeling, scar, blemish, concavity, potato eye 142 illustrated in FIG. 1, etc.) from a remainder 108 of the food product 104 to provide a removed portion 106 of the food product 104. In one embodiment, the abrasive stream 116 comprises a fluid 118 and an abrasive 120. For example, the abrasive 120 can be entrained in the fluid 118 to provide the abrasive stream 116, and an attrition nozzle 114 can be used for directing the abrasive stream 116 into contact with the outer surface 102 of the food product 104. Furthermore, in one embodiment the at least a portion (e.g., a first removed portion 130) of the outer surface 102 of the food product 104 comprises at least 70%, at least 80%, at least 85%, at least 90%, at least 95%, or essentially all of a surface area (e.g., the pre-attrition surface area) of the outer surface 102 (e.g., pre-attrition outer surface) of the food product 104, thereby exposing the food product 104 beneath the outer surface 102. Additionally, in one embodiment, the at least a portion (e.g., a first removed portion 130) of the outer surface 102 (e.g., pre-attrition outer surface) of the food product 104 is removed to a depth (e.g., peel depth) sufficient to remove a targeted outer surface feature 1402 (e.g., peel, bruise, concavity, eye 142 illustrated in FIG. 1, etc.). As another example, in one embodiment, at least 70%, at least 80%, at least 85%, at least 90%, at least 95%, or essentially all of an outer surface 102 of the food product 104 is removed to a depth (e.g., peel thickness) sufficient to remove a targeted outer surface feature 1402 (e.g., peel).

In one embodiment, the abrasive stream 116 does not pass all the way through the food product 104 and does not substantially penetrate past the outer surface 102 of the food product 104. For example, in one embodiment, substantially all or all of the outer surface 102 of the food product 104 is removed to a depth sufficient to remove a targeted portion of the food product 104 while avoiding the removal of a desired portion (e.g., starch).

In one embodiment, a discharge of the abrasive stream 116 is timed to avoid wasting the abrasive stream 116. For example, one embodiment comprises discharging the abrasive stream 116 when the food product 104 is in a discharge path 120 of the abrasive stream 116. As another example, in one embodiment, the discharge of the abrasive stream 116 starts and stops as a result of opening and closing a valve (e.g., quick action and/or solenoid valve). For example, the valve can be located at or proximate an attrition nozzle 114 or the valve can be located remotely from an attrition nozzle (see, e.g., valve 328 for the fluid). In one embodiment, the discharge is timed to start and stop so that substantially the entire abrasive stream 116 contacts the food product 104 and so that the food product 104 is in contact with the abrasive stream 116 substantially the entire time the food product 104 is in the attrition zone 112. As another example, in one embodiment, the discharge is timed to start just before the food product 104 reaches the attrition zone 112 and timed to stop just after the food product 104 leaves the attrition zone 112. Furthermore, in one embodiment, at least one sensor can be used to detect the position and/or velocity of the food product 104, which can be used to predict an intercept time when the food product 104 will reach the attrition zone 112. Accordingly, in one embodiment, the discharge of the abrasive stream 116 can be set to start so the abrasive stream 116 reaches a target point 1002 or an entrance point where the food product 104 enters the attrition zone 112 when the food product 104 reaches the target point 1002 or the entrance point or slightly before, or slightly after the food product 104 reaches the target point 1002 or the entrance point. The approach used can be selected, for example, based on economic considerations.

In one embodiment, the abrasive 120 is introduced into the fluid 118 in the attrition nozzle 114 to provide the abrasive stream 116. In one embodiment, the abrasive 120 is introduced as close to the outlet 140 of the attrition nozzle 114 as feasible to prevent clogs. In one embodiment, the abrasive 120 and a fluid 118 are in fluid communication with an attrition nozzle 114, and the abrasive 120 passes through the attrition nozzle 114 to provide a fluid jet 1304 that creates a force of suction to draw the abrasive 120 into the fluid 118 in the attrition nozzle 114, thereby providing an abrasive stream 116. For example, adding the abrasive 120 to the fluid 118 a minimum distance before the abrasive stream 116 is discharged, can help prevent clogging. Clogging, in turn, can be undesirable because it can block the abrasive 120, fluid 118, and/or abrasive stream 116 from consistently discharging from the attrition nozzle 114 as intended.

In one embodiment, the abrasive stream 116 comprises low relative humidity air. This can be useful to prevent the agglomeration of hydrophilic abrasive molecules (e.g. salt or starch). Similarly, it can be useful to store the abrasive 120 under conditions where the abrasive is not exposed to moisture, including high relative humidity air. For example, in some embodiments, it is useful to store and use the abrasive in an air conditioned environment.

In one embodiment, an attrition nozzle-to-product distance 138 (e.g., shortest distance from an outlet 140 of an attrition nozzle 114 for discharging the abrasive stream 116 to the outer surface 102 of the food product 104) is set based on a desired effect. For example, the attrition nozzle-to-product distance 138 can be set to provide a desired velocity of the abrasive stream 116 upon impact with the food product 104. As another example, given a fixed velocity of an abrasive stream 116 discharged from an attrition nozzle 114, the attrition nozzle-to-product distance 138 can be set to provide the abrasive stream 116 with a desired cross-sectional area upon impact with the food product 104.

In one embodiment, when the attrition nozzle-to-product distance 138 is smaller, the cross-sectional area of the abrasive stream 116 is smaller, which provides more precise control of peeling, but can also result in a need for more attrition nozzles 114 to cover a given area of the outer surface 102 of a the food product 104. Alternatively, in one embodiment, when the attrition nozzle-to-product distance 138 is larger, the cross-sectional area of the abrasive stream 116 is larger, which results in less precise control of peeling, but also enables the use of fewer attrition nozzles 114 to cover a given area of the outer surface 102 of a the food product 104. In one embodiment, a maximum attrition nozzle-to-product distance 138 is the distance such that the cross-sectional area of the abrasive stream 116 does not extend or does not substantially extend beyond the outer surface 102 of the food product 104. For example, in one embodiment, an equivalent spherical diameter of the food product 104 ranges from about 1⅝ inches to about 4 inches. For example, an equivalent spherical diameter of an object with a given volume is the diameter of a sphere with the same given volume. Accordingly, in one embodiment, the maximum attrition nozzle-to-product distance 138 is a distance such that the cross-sectional area of the abrasive stream 116 has an equivalent circular diameter of about 1⅝ inches to about 4 inches. For example, an equivalent circular diameter of an area is the diameter of a circle with the same area.

Fifth, in a measuring step 1508, the removed portion 106 of the food product 104 is measured to provide a measurement of the removed portion 106 of the food product 104. In one embodiment, the measuring step 1508 comprises sensing the surface area of the food product 104 from which the outer surface 102 has been removed. For example, this can be done by using video, optical, or color sensors to provide real-time data. As another example, a sensor can be used to measure the weight of the food product 104 and the remainder 108 of the food product 104, and/or the removed portion 106 of the food product 104. In addition, the measuring step 1508 can be used to provide feedback to adjust the energy transferred to a food product 104, for example, by adjusting a mass flow rate of the abrasive 120, a velocity of the abrasive stream 116, an attrition nozzle-to-product distance 138, and/or a duration of time that the food product 104 is exposed to the abrasive stream 116. Although the measurement can occur while the product is experiencing attrition, the measurement step can occur after a food product 104 has passed through the attrition zone 112. This can be useful if the abrasive stream 116 would interfere with a particular method of measuring attrition. Additionally, measuring attrition after the food product has passed through the attrition zone 112 can be useful to provide feedback to a method and/or apparatus for adjusting the energy transferred to a subsequent food product, and thereby the rate and/or degree of attrition of the subsequent food product.

Sixth, in a discharge stopping step 1510, the discharge of the abrasive stream 116 is stopped when a specified condition is achieved. For example, one embodiment comprises stopping the discharge of the abrasive stream 116 (e.g., by shutting a valve) when a desired amount of the outer surface 102 of the food product 104 has been removed. Furthermore, in one embodiment, at least one sensor can be used to detect the position and/or velocity of the food product 104, which can be used to predict an intercept time when the food product 104 will exit the attrition zone 112. Accordingly, in one embodiment, the discharge of the abrasive stream 116 can be set to stop so that the abrasive stream 116 terminates when the food product 104 reaches a target point 1002 or an exit point of the attrition zone 112 or slightly before or slightly after the food product 104 reaches the target point 1002 or the exit point. The approach used can be selected, for example, based upon economic considerations. As another example, one embodiment comprises stopping the discharge of the abrasive stream 116 when the food product 104 has passed out of the attrition zone 112.

Seventh, in a remainder separating step 1512, the abrasive 120 and the removed portion 106 of the food product 104 are separated from the remainder 108 of the food product 104 using a remainder separator 302. For example, in one embodiment, all or substantially all of the remainder 108 of the food product 104 is captured by a remainder separator 302 and received by post-attrition food product receiver 320. For example, the remainder separator 302 can employ solid-solid separation techniques based on the size difference between the abrasive 120 and the removed portion 106 of the food product 104, on the one hand, and the remainder 108 of the food product 104, on the other hand. As further examples, the remainder separator 302 can be a slot or screen that is sized large enough for the abrasive 120 and removed portion 106 of the food product 104 to pass through and also sized small enough that the remainder 108 of the food product 104 cannot pass through the slot or screen.

Eighth, in an abrasive-removed-portion separating step 1514, the abrasive 120 is separated from the removed portion to provide a segregated abrasive 120a. In one embodiment, this is done using density-based separation techniques (e.g., using a centrifugal separator or hydrocyclone).

Ninth, in an abrasive 120 recycling step 1516, the segregated abrasive 120a is recycled to provide a recycle abrasive 250. For example, in some embodiments, the segregated abrasive 120a can be further separated into recycle abrasive 250 and fine abrasive 252. In some embodiments, the recycle abrasive 250 is reused as abrasive 120 without further processing, while the fine abrasive 252 is further processed (e.g., by dissolving in water and recrystallizing) before reuse as abrasive 120.

Additionally, in some embodiments, once a desired degree of attrition has been achieved for a food product 104, at least some method steps are repeated to achieve a desired degree of attrition for a subsequent food product 104.

In one embodiment, a method for causing attrition to an outer surface 102 of a food product 104 to provide a removed portion 106 of the food product 104 and a remainder 108 of the food product 104 is a continuous process; although in another embodiment, the method is a batch process.

Although the method has been described with reference to one embodiment with specific steps in a specific order, step can be omitted or added, and the order of the steps can be rearranged in other embodiments. Similarly, while various embodiments of the invention have been described with reference to a food product 104, in other embodiments, the food product 104 can be replaced with another object or product. For example, the invention can be used with other objects for which it is desirable to remove an outer surface 102 of the object.

COMPARATIVE EXAMPLES

In some embodiments, the fluid 118 is provided with at least one desired thermophysical property (e.g., temperature, velocity, viscosity, density, etc.) at the outlet 140 of the attrition nozzle 114. Additionally, in some embodiments the abrasive 120 comprises desirable physical properties (e.g., hardness, size, density, etc.).

In some embodiments, a mass ratio or volume ratio of the abrasive 120 to the fluid 118 is determined to reduce the combined capital and operating expense for causing a desired degree of attrition to a food product 104.

Additional Embodiments

The following clauses are offered as further description of the disclosed invention:
1. A method for causing attrition to an outer surface of a food product to provide a removed portion of the food product and a remainder of the food product, the method comprising:
   discharging an abrasive stream into contact with the outer surface of the food product, thereby providing a discharge of the abrasive stream, and thereby separating at least a portion of the outer surface of the food product from the remainder of the food product to provide the removed portion of the food product;
wherein the abrasive stream comprises a fluid and an abrasive.

2. The method of clause 1 or 62, further comprising the step: positioning the food product into an attrition zone.
3. The method of clause 1 or 62, further comprising the step: sensing a position of the food product.
4. The method of clause 1 or 62, further comprising the step: discharging the abrasive stream from a nozzle.
5. The method of clause 1 or 62, further comprising the step: discharging the abrasive stream when the food product is in a discharge path of the abrasive stream.
6. The method of clause 1 or 62, further comprising the step: measuring the removed portion to provide a measurement of the removed portion to provide feedback to adjust a rate of energy transferred to a subsequent food product.
7. The method of clause 1 or 62, further comprising the step: stopping the discharge of the abrasive stream when the food product has passed out of the attrition zone.
8. The method of clause 1 or 62, further comprising the step: substantially separating the abrasive and removed portion of the product from the remainder of the product.
9. The method of clause 1 or 62, further comprising the step: substantially separating the abrasive from the removed portion of the product to provide a segregated abrasive.
10. The method of clause 1 or 62, further comprising the step:
substantially separating the abrasive from the removed portion of the product to provide a segregated abrasive; and
recycling a segregated abrasive to provide a recycle abrasive.
11. The method of clause 1 or 62, further comprising the step:
providing a feed stream of the abrasive to a nozzle.
12. The method of clause 1 or 62, wherein a rate of kinetic energy imparted to the outer surface of the food product by the abrasive is at least about 93 J/s.
13. The method of clause 1 or 62, wherein a rate of kinetic energy imparted to the outer surface of the food product by the abrasive is about 93-282 J/s.
14. The method of clause 1 or 62, wherein a sum of kinetic energy imparted to the outer surface of the food product by the abrasive is at least about 2.0 J.
15. The method of clause 1 or 62, wherein a sum of kinetic energy imparted to the outer surface of the food product by the abrasive is about 2.0-6.2 J.
16. The method of clause 1 or 62, wherein a rate of momentum imparted to the outer surface of the food product by the abrasive is at least about 0.80 g*m/s$^2$.
17. The method of clause 1 or 62, wherein a rate of momentum imparted to the outer surface of the food product by the abrasive is about 0.80-2.42 g*m/s$^2$.
18. The method of clause 1 or 62, wherein a sum of momentum imparted to the outer surface of the food product by the abrasive is at least about 0.018 g*m/s.
19. The method of clause 1 or 62, wherein a sum of momentum imparted to the outer surface of the food product by the abrasive is about 0.018-0.053 g*m/s.
20. The method of clause 1 or 62, wherein the abrasive is salt; and
wherein a point on the outer surface of the food product spends at least about 11 milliseconds in contact with the abrasive stream.

21. The method of clause 1 or 62, wherein the abrasive is potato starch; and
wherein a point on the outer surface of the food product spends at least about 1000 milliseconds in contact with the abrasive stream.
22. The method of clause 1 or 62, wherein a point on the outer surface of the food product spends about 11-1000 milliseconds in contact with the abrasive stream.
23. The method of clause 1 or 62, wherein a mass flow rate of the abrasive in the abrasive stream is controlled separately from a mass flow rate of the fluid in the abrasive stream.
24. The method of clause 1 or 62, wherein an average linear velocity of the abrasive stream is about 38-115 m/s.
25. The method of clause 1 or 62, wherein an average linear velocity of the abrasive in the abrasive stream is about 38-115 m/s.
26. The method of clause 1 or 62, wherein an average linear velocity of the fluid in the abrasive stream is about 38-115 m/s.
27. The method of clause 1 or 62, wherein a velocity pressure head of the abrasive stream at an outlet of a nozzle for discharging the abrasive stream is 200-620 kPa.
28. The method of clause 1 or 62, wherein a shortest distance from an outlet of a nozzle for discharging the abrasive stream to the outer surface of the food product is about 0.02-0.13 m.
29. The method of clause 1 or 62, wherein the abrasive comprises a hardness at least as large as a hardness of the removed portion of the food product.
30. The method of clause 1 or 62, wherein the abrasive comprises a hardness of at least about 5 Mohs.
31. The method of clause 1 or 62, wherein the abrasive comprises an average particle size of 20-20,000 μm, with an average sphericity of 0.5-1.0 and an average aspect ratio of 0.5-1.0.
32. The method of clause 1 or 62, wherein the abrasive comprises salt.
33. The method of clause 1 or 62, wherein the abrasive comprises starch.
34. The method of clause 1 or 62, wherein the fluid comprises air.
35. The method of clause 1 or 62, wherein the fluid comprises water.
36. The method of clause 1 or 62, wherein the abrasive stream is provided at an incident angle to the outer surface of the food product, and wherein the incident angle is about 0-20 degrees.
37. The method of clause 1 or 62, wherein the abrasive is in fluid communication with a nozzle;
wherein the fluid is in fluid communication with the nozzle;
wherein the fluid passes through the nozzle to provide a fluid jet; and
wherein the fluid jet creates a force of suction to draw the abrasive into the fluid in the nozzle, thereby providing the abrasive stream.
38. The method of clause 1 or 62, further comprising:
introducing the abrasive into the fluid in a nozzle to provide the abrasive stream.
39. An apparatus for causing attrition to an outer surface of a food product to provide a removed portion of the food product and a remainder of the food product, the apparatus comprising:
a product positioner to position the food product in an attrition zone; and a nozzle for discharging an abrasive stream into contact with the food product in the attrition zone, wherein the abrasive stream comprises a fluid and an abrasive entrained in the fluid.

40. The apparatus of clause 39, further comprising:
a remainder separator for substantially separating the remainder of the product from the removed portion of the product.

41. The apparatus of clause 39, further comprising:
a fluid source in fluid communication with the nozzle.

42. The apparatus of clause 39, further comprising:
an abrasive source in fluid communication with the nozzle.

43. The apparatus of clause 39, further comprising:
a plurality of nozzles.

44. The apparatus of clause 39, further comprising:
an abrasive source for each of a plurality of nozzles.

45. The apparatus of clause 39, further comprising:
a pressurizer.

46. The apparatus of clause 39, further comprising:
an attrition chamber.

47. The apparatus of clause 39, further comprising:
an abrasive metering valve.

48. The apparatus of clause 39, further comprising:
an abrasive metering valve to control a mass flow rate of the abrasive.

49. The apparatus of clause 39, further comprising:
an abrasive metering valve for each of a plurality of nozzles to control a mass flow rate of the abrasive to each of the nozzles.

50. The apparatus of clause 39, further comprising:
a vacuum source.

51. The apparatus of clause 39, further comprising:
an inlet filter for a vacuum source.

52. The apparatus of clause 39, further comprising:
a mechanism (e.g., baffle, hydrocyclone) for changing a velocity of solids entrained in the fluid relative to a velocity of the fluid so that the solids settle out of the fluid.

53. The apparatus of clause 39, further comprising:
a post-attrition food product receiver.

54. The apparatus of clause 39, further comprising:
a post-attrition abrasive receiver.

55. The apparatus of clause 39, further comprising:
a product stream separator for further separating the remainder of the food product from the removed portion of the product and the abrasive.

56. The apparatus of clause 39, further comprising:
a byproduct stream separator for further separating at least two components selected from the group consisting of recycle abrasive, fine abrasive, a first removed portion of the food product, and a second removed portion of the food product.

57. The apparatus of clause 39, further comprising:
an abrasive-removed-portion separator for substantially separating the removed portion of the product from the abrasive to provide a segregated abrasive.

58. The apparatus of clause 39, further comprising:
a secondary removed portion separator for substantially separating a desired portion of the removed portion from another part of the removed portion.

59. The apparatus of clause 39, wherein the nozzle is positioned and oriented to provide an incident angle of about 0-20 degrees.
wherein the incident angle is an angle between an average direction of the abrasive stream and a line normal to the outer surface of the food product at a point of intersection where the average direction of the abrasive stream intersects the outer surface of the food product.

60. The apparatus of clause 39, wherein a plurality of nozzles are positioned and oriented to direct a plurality of abrasive streams at a target point.

61. The apparatus of clause 39, wherein the nozzle further comprises:
a fluid jet nozzle to provide a fluid jet;
an abrasive conduit to direct the abrasive toward an outlet of the fluid jet nozzle;
an abrasive stream discharge nozzle to discharge the abrasive stream, wherein the abrasive stream is formed when the fluid jet draws the abrasive through the abrasive conduit and into the fluid jet;
a path of fluid communication for the fluid between a fluid source and the fluid jet nozzle; and
a path of fluid communication for the abrasive between a source for the abrasive and the abrasive conduit.

62. A method for causing attrition to an outer surface of a food product to provide a removed portion of the food product and a remainder of the food product, the method comprising:
bringing an abrasive stream into contact with the outer surface of the food product, thereby separating at least a portion of the outer surface of the food product from the remainder of the food product to provide the removed portion of the food product;
wherein the abrasive stream comprises a fluid and an abrasive.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:
1. A method for causing attrition to an outer surface of a food product to provide a removed portion of the food product and a remainder of the food product, the method comprising:
sensing a position of the food product;
discharging an abrasive stream into contact with the outer surface of the food product, thereby providing a discharge of the abrasive stream, and thereby separating at least a portion of the outer surface of the food product from the remainder of the food product to provide the removed portion of the food product, wherein the abrasive stream comprises a fluid and an abrasive, wherein the outer surface comprises a peel;
substantially separating the abrasive and the removed portion of the food product from the remainder of the food product;
substantially separating the abrasive from the removed portion of the food product to provide a segregated abrasive; and
recycling the segregated abrasive to provide a recycle abrasive.

2. The method of claim 1, further comprising the step: positioning the food product into an attrition zone.

3. The method of claim 1, comprising the step: discharging the abrasive stream when the food product is in a discharge path of the abrasive stream.

4. The method of claim 2, further comprising the step: stopping the discharge of the abrasive stream when the food product has passed out of the attrition zone.

5. The method of claim 1, wherein a rate of kinetic energy imparted to the outer surface of the food product by the abrasive is at least 93 J/s.

6. The method of claim 1, wherein a sum of kinetic energy imparted to the outer surface of the food product by the abrasive is at least 2.0 J.

7. The method of claim 1, wherein a rate of momentum imparted to the outer surface of the food product by the abrasive is at least 0.80 g*m/s2.

8. The method of claim 1, wherein a sum of momentum imparted to the outer surface of the food product by the abrasive is at least 0.018 g*m/s.

9. The method of claim 1, wherein the abrasive is salt; and wherein a point on the outer surface of the food product spends at least 11 milliseconds in contact with the abrasive stream.

10. The method of claim 1, wherein the abrasive is potato starch; and wherein a point on the outer surface of the food product spends at least 1000 milliseconds in contact with the abrasive stream.

11. The method of claim 1, wherein an average linear velocity of the abrasive stream is 38-115 m/s.

12. The method of claim 1, wherein a velocity pressure head of the abrasive stream at an outlet of a nozzle for discharging the abrasive stream is 200-620 kPa.

13. The method of claim 1, wherein a shortest distance from an outlet of a nozzle for discharging the abrasive stream to the outer surface of the food product is 0.02-0.13 m.

14. The method of claim 1, wherein the abrasive comprises a hardness at least as large as a hardness of the removed portion of the food product.

15. The method of claim 1, wherein the abrasive comprises an average particle size of 20-20,000 μm, with an average sphericity of 0.5-1.0 and an average aspect ratio of 0.5-1.0.

16. The method of claim 1, wherein the abrasive comprises salt.

17. The method of claim 1, wherein the fluid comprises air.

18. The method of claim 1, wherein the fluid comprises water.

19. The method of claim 1, wherein the abrasive is in fluid communication with a nozzle;
wherein the fluid is in fluid communication with the nozzle;
wherein the fluid passes through the nozzle to provide a fluid jet; and
wherein the fluid jet creates a force of suction to draw the abrasive into the fluid in the nozzle, thereby providing the abrasive stream.

20. The method of claim 1, comprising:
introducing the abrasive into the fluid in a nozzle to provide the abrasive stream.

21. The method of claim 1, wherein at least 70% by surface area of the outer surface of the food product is removed to a depth sufficient to remove the peel of the food product.

22. The method of claim 1, wherein the abrasive stream does not substantially penetrate past the outer surface of the food product.

23. The method of claim 2, wherein positioning the food product in the attrition zone comprises allowing the food product to fall into the attrition zone.

24. A method for causing attrition to an outer surface of a food product to provide a removed portion of the food product and a remainder of the food product, the method comprising:
sensing a position of the food product;
discharging an abrasive stream into contact with the outer surface of the food product, thereby providing a discharge of the abrasive stream, and thereby separating at least a portion of the outer surface of the food product from the remainder of the food product to provide the removed portion of the food product, wherein the abrasive stream comprises a fluid and an abrasive, and wherein the outer surface comprises a peel; and
substantially separating the abrasive and the removed portion of the food product from the remainder of the food product;
wherein a mass flow rate of the abrasive in the abrasive stream is controlled separately from a mass flow rate of the fluid in the abrasive stream.

25. A method for causing attrition to an outer surface of a food product to provide a removed portion of the food product and a remainder of the food product, the method comprising:
sensing a position of the food product;
discharging an abrasive stream into contact with the outer surface of the food product, thereby providing a discharge of the abrasive stream, and thereby separating at least a portion of the outer surface of the food product from the remainder of the food product to provide the removed portion of the food product, wherein the abrasive stream comprises a fluid and an abrasive, and wherein the outer surface comprises a peel; and
substantially separating the abrasive and the removed portion of the food product from the remainder of the food product;
wherein the abrasive comprises a hardness of at least 5 Mohs.

26. A method for causing attrition to an outer surface of a food product to provide a removed portion of the food product and a remainder of the food product, the method comprising:
sensing a position of the food product;
discharging an abrasive stream into contact with the outer surface of the food product, thereby providing a discharge of the abrasive stream, and thereby separating at least a portion of the outer surface of the food product from the remainder of the food product to provide the removed portion of the food product, wherein the abrasive stream comprises a fluid and an abrasive, and wherein the outer surface comprises a peel; and
substantially separating the abrasive and the removed portion of the food product from the remainder of the food product;
wherein the abrasive comprises starch.

27. An apparatus for causing attrition to an outer surface of a food product to provide a removed portion of the food product and a remainder of the food product, the apparatus comprising:
a product positioner to position the food product in an attrition zone;

a nozzle for discharging an abrasive stream into contact with the food product in the attrition zone, wherein the abrasive stream comprises a fluid and an abrasive entrained in the fluid;
a sensor to determine a position of the food product;
a remainder separator for substantially separating the remainder of the food product from the removed portion of the food product;
a byproduct stream separator for further separating at least two components selected from the group consisting of a recycle abrasive, a fine abrasive, a first removed portion of the food product, and a second removed portion of the food product; and
an abrasive metering valve;
wherein the apparatus is configured to stop the discharge of the abrasive stream when the food product has passed out of the attrition zone; and
wherein the outer surface comprises a peel.

28. The apparatus of claim 27, further comprising:
a fluid source in fluid communication with the nozzle.

29. The apparatus of claim 27, further comprising:
an abrasive source in fluid communication with the nozzle.

30. The apparatus of claim 27, comprising:
a plurality of nozzles.

31. The apparatus of claim 27, further comprising:
a pressurizer.

32. The apparatus of claim 27, further comprising:
an attrition chamber.

33. The apparatus of claim 27, further comprising:
a post-attrition food product receiver.

34. The apparatus of claim 27, further comprising:
a post-attrition abrasive receiver.

35. The apparatus of claim 27, wherein the nozzle comprises:
a fluid jet nozzle to provide a fluid jet;
an abrasive conduit to direct the abrasive toward an outlet of the fluid jet nozzle;
an abrasive stream discharge nozzle to discharge the abrasive stream, wherein the abrasive stream is formed when the fluid jet draws the abrasive through the abrasive conduit and into the fluid jet;
a path of fluid communication for the fluid between a fluid source and the fluid jet nozzle; and
a path of fluid communication for the abrasive between a source for the abrasive and the abrasive conduit.

36. The apparatus of claim 27, wherein the product positioner is configured to allow the food product to fall into the attrition zone.

37. The apparatus of claim 27, wherein a rate of kinetic energy imparted to the outer surface of the food product by the abrasive is at least 93 J/s.

38. The apparatus of claim 27, wherein a sum of kinetic energy imparted to the outer surface of the food product by the abrasive is at least 2.0 J.

39. The apparatus of claim 27, wherein a rate of momentum imparted to the outer surface of the food product by the abrasive is at least 0.80 g*m/s2.

40. The apparatus of claim 27, wherein a sum of momentum imparted to the outer surface of the food product by the abrasive is at least 0.018 g*m/s.

41. The apparatus of claim 27, wherein the fluid comprises a gas.

42. An apparatus for causing attrition to an outer surface of a food product to provide a removed portion of the food product and a remainder of the food product, the apparatus comprising:

a product positioner to position the food product in an attrition zone;
a nozzle for discharging an abrasive stream into contact with the food product in the attrition zone, wherein the abrasive stream comprises a fluid and an abrasive entrained in the fluid;
a sensor to determine a position of the food product;
a remainder separator for substantially separating the remainder of the food product from the removed portion of the food product;
a byproduct stream separator for further separating at least two components selected from the group consisting of a recycle abrasive, a fine abrasive, a first removed portion of the food product, and a second removed portion of the food product; and
a vacuum source;
wherein the apparatus is configured to stop the discharge of the abrasive stream when the food product has passed out of the attrition zone; and
wherein the outer surface comprises a peel.

43. An apparatus for causing attrition to an outer surface of a food product to provide a removed portion of the food product and a remainder of the food product, the apparatus comprising:
a product positioner to position the food product in an attrition zone;
a nozzle for discharging an abrasive stream into contact with the food product in the attrition zone, wherein the abrasive stream comprises a fluid and an abrasive entrained in the fluid;
a sensor to determine a position of the food product;
remainder separator for substantially separating the remainder of the food product from the removed portion of the food product;
a byproduct stream separator for further separating at least two components selected from the group consisting of a recycle abrasive, a fine abrasive, a first removed portion of the food product, and a second removed portion of the food product; and
an inlet filter for a vacuum source;
wherein the apparatus is configured to stop the discharge of the abrasive stream when the food product has passed out of the attrition zone; and
wherein the outer surface comprises a peel.

44. An apparatus for causing attrition to an outer surface of a food product to provide a removed portion of the food product and a remainder of the food product, the apparatus comprising:
a product positioner to position the food product in an attrition zone;
a nozzle for discharging an abrasive stream into contact with the food product in the attrition zone, wherein the abrasive stream comprises a fluid and an abrasive entrained in the fluid;
a sensor to determine a position of the food product;
a remainder separator for substantially separating the remainder of the food product from the removed portion of the food product;
a byproduct stream separator for further separating at least two components selected from the group consisting of a recycle abrasive, a fine abrasive, a first removed portion of the food product, and a second removed portion of the food product; and
a mechanism for changing a velocity of solids entrained in the fluid relative to a velocity of the fluid so that the solids settle out of the fluid;

wherein the apparatus is configured to stop the discharge of the abrasive stream when the food product has passed out of the attrition zone; and wherein the outer surface comprises a peel.

45. The apparatus of claim 44, wherein the mechanism comprises a baffle.

46. An apparatus for causing attrition to an outer surface of a food product to provide a removed portion of the food product and a remainder of the food product, the apparatus comprising:
 a product positioner to position the food product in an attrition zone;
 a nozzle for discharging an abrasive stream into contact with the food product in the attrition zone, wherein the abrasive stream comprises a fluid and an abrasive entrained in the fluid;
 a sensor to determine a position of the food product;
 a remainder separator for substantially separating the remainder of the food product from the removed portion of the food product;
 a byproduct stream separator for further separating at least two components selected from the group consisting of a recycle abrasive, a fine abrasive, a first removed portion of the food product, and a second removed portion of the food product; and
 a mechanism for changing a velocity of solids entrained in the fluid relative to a velocity of the fluid so that the solids settle out of the fluid, wherein the mechanism comprises a baffle;
wherein the apparatus is configured to stop the discharge of the abrasive stream when the food product has passed out of the attrition zone; and
wherein the outer surface comprises a peel.

* * * * *

UNITED STATES PATENT AND TRADEMARK OFFICE
CERTIFICATE OF CORRECTION

PATENT NO. : 10,010,106 B2  
APPLICATION NO. : 14/919845  
DATED : July 3, 2018  
INVENTOR(S) : Wilfred Marcellien Bourg, Jr., Stephen Graham and Richard James Ruegg It is certified that error appears in the above-identified patent and that said Letters Patent is hereby corrected as shown below:

In Claim 43, at Column 26, Line 33, please add the word -- a -- before the word "remainder".

Signed and Sealed this  
Sixteenth Day of October, 2018

Andrei Iancu  
*Director of the United States Patent and Trademark Office*